(12) United States Patent
Liu

(10) Patent No.: US 12,099,709 B2
(45) Date of Patent: Sep. 24, 2024

(54) DISPLAY METHOD AND APPARATUS, ELECTRONIC DEVICE, AND STORAGE MEDIUM

(71) Applicant: BEIJING ZITIAO NETWORK TECHNOLOGY CO., LTD., Beijing (CN)

(72) Inventor: Tianxiang Liu, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/515,497

(22) Filed: Nov. 21, 2023

(65) Prior Publication Data

US 2024/0086053 A1 Mar. 14, 2024

Related U.S. Application Data

(63) Continuation of application No. PCT/CN2022/091884, filed on May 10, 2022.

(30) Foreign Application Priority Data

May 21, 2021 (CN) .......................... 202110559266.X

(51) Int. Cl.
   G06F 3/048      (2013.01)
   G06F 3/0481     (2022.01)
   (Continued)

(52) U.S. Cl.
   CPC ........ G06F 3/04845 (2013.01); G06F 3/0481 (2013.01); G06F 3/0488 (2013.01); G06F 2203/04803 (2013.01)

(58) Field of Classification Search
   CPC .. G06F 3/04845; G06F 3/0481; G06F 3/0488; G06F 2203/04803
   See application file for complete search history.

(56) References Cited

U.S. PATENT DOCUMENTS

2006/0277492 A1*  12/2006  Matthews ............... G06F 9/451
                                                   715/789
2013/0239063 A1*  9/2013  Ubillos .................. G06F 3/0485
                                                   715/838
(Continued)

FOREIGN PATENT DOCUMENTS

CN      104346096 A      2/2015
CN      104461244 A      3/2015
(Continued)

OTHER PUBLICATIONS

Office Action issued in Chinese Patent Application No. 202110559266.X, Nov. 25, 2022 (8 pages).
(Continued)

*Primary Examiner* — Linh K Pham
(74) *Attorney, Agent, or Firm* — HSML P.C.

(57) ABSTRACT

Disclosed in embodiments of the present disclosure are a display method and apparatus, an electronic device, and a storage medium. The method comprises: in response to a first operation acting on a first interface, the first interface being displayed on a target area of an interactive interface, controlling the first interface and a preset second interface to move in a first direction, and controlling the second interface to display in the target area, wherein if the second interface does not satisfy a preset condition, the second interface is controlled to enter a first display state, so that an upper boundary of the second interface is aligned with an upper boundary of the target area; in response to a second operation acting on the second interface in the first display state, controlling the second interface to move in a second direction, the second interface entering a second display state from the first display state; and triggering a state locking to limit the second interface to return from the second display state to the first display state.

19 Claims, 19 Drawing Sheets

In response to a first operation acting on a first interface being displayed on a target area of an interactive interface, controlling the first interface and a preset second interface to move in a first direction, and controlling the second interface to be displayed in the target area, wherein if the second interface does not satisfy a preset condition, controlling the second interface to enter a first display state, so that an upper boundary of the second interface is aligned with an upper boundary of the target area ─── 110

In response to a second operation acting on the second interface in the first display state, control the second interface to move in a second direction, the second interface entering a second display state from the first display state to change a display position of the second interface in the target area, wherein, the second direction is perpendicular to the first direction ─── 120

Triggering a state lock logic in the second display state, to limit the second interface to return from the second display state to the first display state ─── 130

(51) Int. Cl.
  *G06F 3/04845* (2022.01)
  *G06F 3/0488* (2022.01)

(56) References Cited

U.S. PATENT DOCUMENTS

| | | |
|---|---|---|
| 2015/0046866 A1 | 2/2015 | Shimadate |
| 2016/0132074 A1* | 5/2016 | Kim ................. G06F 1/1652 345/173 |
| 2017/0178596 A1* | 6/2017 | Ishikawa ............ G06F 3/0481 |
| 2017/0220226 A1* | 8/2017 | Wu .................... G06F 3/0485 |
| 2018/0091728 A1* | 3/2018 | Brown .................. H04N 5/91 |
| 2018/0146233 A1 | 5/2018 | Satheesh et al. |
| 2018/0164963 A1* | 6/2018 | Ku .................... G06F 3/04842 |
| 2018/0335939 A1* | 11/2018 | Karunamuni ........... G06F 9/445 |
| 2019/0102366 A1 | 4/2019 | Li et al. |
| 2020/0099796 A1* | 3/2020 | Yoshida ............ H04N 1/00188 |
| 2020/0319781 A1* | 10/2020 | Yoshida .................. G06T 1/00 |
| 2022/0108541 A1* | 4/2022 | Ozone .................. G06F 3/017 |

FOREIGN PATENT DOCUMENTS

| | | |
|---|---|---|
| CN | 106484416 A | 3/2017 |
| CN | 106503124 A | 3/2017 |
| CN | 108881616 A | 11/2018 |
| CN | 109669617 A | 4/2019 |
| CN | 108563377 A | 9/2019 |
| CN | 110647369 A | 1/2020 |
| CN | 111104177 A | 5/2020 |
| CN | 111228793 A | 6/2020 |
| CN | 113204299 A | 8/2021 |
| JP | 2014-195311 A | 10/2014 |

OTHER PUBLICATIONS

International Search Report and Written Opinion, International Patent Application No. PCT/CN2022/091884, Jul. 18, 2022, with English translation of Search Report (10 pages).

* cited by examiner

In response to a first operation acting on a first interface being displayed on a target area of an interactive interface, controlling the first interface and a preset second interface to move in a first direction, and controlling the second interface to be displayed in the target area, wherein if the second interface does not satisfy a preset condition, controlling the second interface to enter a first display state, so that an upper boundary of the second interface is aligned with an upper boundary of the target area ⎯ 110

In response to a second operation acting on the second interface in the first display state, control the second interface to move in a second direction, the second interface entering a second display state from the first display state to change a display position of the second interface in the target area, wherein, the second direction is perpendicular to the first direction ⎯ 120

Triggering a state lock logic in the second display state, to limit the second interface to return from the second display state to the first display state ⎯ 130

Fig.1

DISPLAY METHOD AND APPARATUS, ELECTRONIC DEVICE, AND STORAGE MEDIUM

CROSS-REFERENCE TO RELATED APPLICATIONS

The present application is a U.S. National Stage Application under 35 U.S.C. § of International application No. PCT/CN2022/091884 filed on May 10, 2022, which claims the priority to the Chinese Patent Application No. 202110559266.X filed on May 21, 2021, and entitled "DISPLAY METHOD AND APPARATUS, ELECTRONIC DEVICE, AND STORAGE MEDIUM", the disclosure of which is incorporated by reference herein in its entirety.

TECHNICAL FIELD

The present disclosure relates to the field of information technology, and in particular, to a display method and apparatus, an electronic device, and a storage medium.

BACKGROUND

With the continuous development of network technology, various mobile terminal applications have been emerging continuously. Users have increasing requirements for interactive comfort of the mobile terminal applications.

Therefore, it is necessary to continue improving an existing interactive mode with the aim of improving display effect of interaction and interaction related performance, to continuously enhance the comfort in interaction.

SUMMARY

In order to solve the above technical problems or at least partially solve the above technical problems, embodiments of the present disclosure provide a display method and apparatus, an electronic device, and a storage medium, capable of improving display effect of interaction and interaction related performance by changing display method in interaction.

The embodiments of the present disclosure provide a display method, comprising:
  in response to a first operation acting on a first interface being displayed on a target area of an interactive interface, controlling the first interface and a preset second interface to move in a first direction, and controlling the second interface to be displayed in the target area, wherein if the second interface does not satisfy a preset condition, controlling the second interface to enter a first display state, so that an upper boundary of the second interface is aligned with an upper boundary of the target area;
  in response to a second operation acting on the second interface in the first display state, controlling the second interface to move in a second direction, the second interface entering a second display state from the first display state to change a display position of the second interface in the target area, wherein, the second direction is perpendicular to the first direction; and triggering a state locking in the second display state to limit the second interface to return from the second display state to the first display state.

The embodiments of the present disclosure further provide a display apparatus, comprising:
  a first display module configured to, in response to a first operation acting on a first interface being displayed on a target area of an interactive interface, control the first interface and a preset second interface to move in a first direction, and control the second interface to be displayed in the target area, wherein if the second interface does not satisfy a preset condition, control the second interface to enter a first display state, so that an upper boundary of the second interface is aligned with an upper boundary of the target area;
  a second display module configured to, in response to a second operation acting on the second interface in the first display state, control the second interface to move in a second direction, the second interface entering a second display state from the first display state to change a display position of the second interface in the target area, wherein, the second direction is perpendicular to the first direction; and
  a triggering module configured to trigger a state locking in the second display state, to limit the second interface to return from the second display state to the first display state.

The embodiments of the present disclosure further provide an electronic device, comprising:
  one or more processors;
  storage means configured to store one or more programs, wherein the one or more programs, when executed by the one or more processors, cause the one or more processors to implement the display method as described above.

The embodiments of the present disclosure further provide a non-transitory computer-readable storage medium having thereon stored a computer program which, when executed by a processor, implements the display method as described above.

The embodiments of the present disclosure further provide a computer program comprising instructions which, when executed by a processor, implement the display method as described above.

The embodiments of the present disclosure further provide a computer program product comprising a computer program or instructions which, when executed by a processor, implement the display method as described above.

The technical solution provided by the embodiments of the present disclosure at least has the following advantages.

The display method provided by the embodiments of the present disclosure comprises: in response to a first operation acting on a first interface being displayed on a target area of an interactive interface, controlling the first interface and a preset second interface to move in a first direction, and controlling the second interface to be displayed in the target area, wherein if the second interface does not satisfy a preset condition, controlling the second interface to enter a first display state, so that an upper boundary of the second interface is aligned with an upper boundary of the target area; in response to a second operation acting on the second interface in the first display state, controlling the second interface to move in a second direction, the second interface entering a second display state from the first display state to change a display position of the second interface in the target area, wherein, the second direction is perpendicular to the first direction; and triggering a state locking in the second display state, to limit the second interface to return from the second display state to the first display state.

BRIEF DESCRIPTION OF THE DRAWINGS

The above and other features, advantages, and aspects of the embodiments of the present disclosure will become more apparent in conjunction with the accompanying drawings and with reference to the following DETAILED DESCRIPTION. Throughout the drawings, identical or similar reference numbers refer to identical or similar elements. It should be understood that the drawings are illustrative and that components and elements are not necessarily drawn to scale.

FIG. 1 is a flow diagram of a display method in an embodiment of the present disclosure;

DETAILED DESCRIPTION

Figure 2:
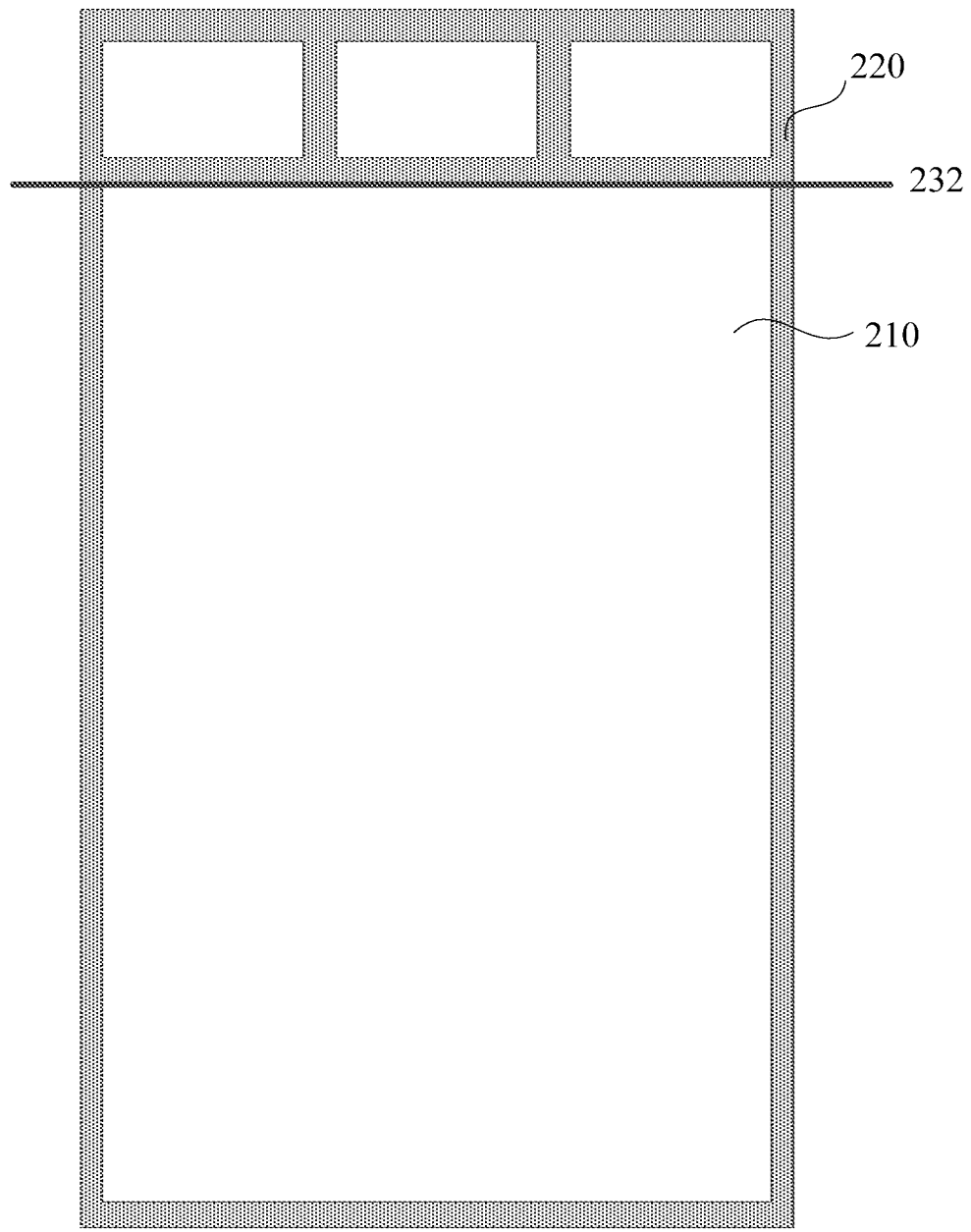
FIG. 2 is a schematic diagram of an interactive interface where a first interface is displayed in an embodiment of the present disclosure.

The embodiments of the present disclosure will be described in more detail below with reference to the accompanying drawings. While certain embodiments of the present disclosure are shown in the drawings, it should be understood that the present disclosure may be implemented in various forms and should not be construed as limited to the embodiments set forth herein, which are provided for a more complete and thorough understanding of the present disclosure instead. It should be understood that the drawings and the embodiments of the present disclosure are for illustration purposes only and are not intended to limit the scope of protection of the present disclosure.

It should be understood that various steps recited in method embodiments of the present disclosure may be performed in a different order, and/or performed in parallel. Moreover, the method embodiments may include additional steps and/or omit performing the illustrated steps. The scope of the present disclosure is not limited in this respect.

The term "comprise" and variations thereof used herein are intended to be open-ended, i.e., "comprising but not limited to". The term "based on" is "based at least partially on". The term "one embodiment" means "at least one embodiment"; the term "another embodiment" means "at least one other embodiment"; and the term "some embodiments" means "at least some embodiments". Relevant definitions for other terms will be given in the following description.

It should be noted that the terms such as "first" and "second" mentioned in the present disclosure are only used for distinguishing different devices, modules or units, and are not used for limiting the order or interdependence of the functions performed by the devices, modules or units.

It should be noted that the modifications of "a" or "a plurality" mentioned in the present disclosure are intended to be illustrative rather than restrictive, and those skilled in the art will appreciate that they should be understood as "one or more" unless otherwise explicitly stated in the context.

The names of messages or information exchanged between a plurality of devices in the embodiments of the present disclosure are for illustrative purposes only, and are not intended to limit the scope of the messages or information.

In the display method provided by the embodiments of the present disclosure, the state locking of the second display state can effectively ensure the interactive operation experience of users, reduce invalid interactive operations of the users, and a transition interface, namely the first display state of the second interface, is added in redirection from another interface to a state lock interface, so that no sudden change will occur in the interactive interface redirection.

An existing mobile terminal application often includes a plurality of nested interfaces, each supporting different gesture operations, or a same gesture operation acting on different interfaces will redirect to different display interfaces.

In this embodiment, in a preset situation, a state locking will be triggered, and different nested interfaces will be limited to be displayed in a predetermined area to reduce invalid operations of a user, for example, when a display interface has less content to be sufficiently displayed within one screen, display of different nested interfaces in a predetermined area of the same screen can avoid an invalid swipe up operation of a user. However, due to the existence of the above state locking, the display interface is prone to a sudden change in interaction between the nested interfaces, resulting in poor display effect of interaction and interaction related performance. Therefore, in the embodiment, a transition interface is added in redirection from another interface to a state lock interface, so that the sudden change will not occur in the display interface redirection.

FIG. 1 is a flow diagram of a display method in an embodiment of the present disclosure. The method may be executed by a display apparatus, and the apparatus may be implemented in software and/or hardware and may be configured in an electronic device such as a terminal, specifically including but not limited to a smart phone, a palmtop computer, a tablet computer, a wearable device with an interactive interface, a desktop computer, a notebook computer, an all-in-one machine, a smart home device, and the like.

As shown in FIG. 1, the method may specifically comprise the following steps:

Step 110, in response to a first operation acting on a first interface being displayed on a target area of an interactive interface, controlling the first interface and a preset second interface to move in a first direction, and controlling the second interface to be displayed in the target area, wherein if the second interface does not satisfy a preset condition, controlling the second interface to enter a first display state, so that an upper boundary of the second interface is aligned with an upper boundary of the target area.

In an implementation, reference is made to FIG. 2, which illustrates a schematic diagram of an interactive interface where a first interface is displayed, where the first interface 210 is included, and an area occupied by the first interface 210 at present in an interactive interface 220 is a target area, that is, the first interface 210 is displayed on the target area of the interactive interface 220. The first operation may specifically be a horizontal swipe operation, for example, a swipe left operation or a swipe right operation, and the first operation may also specifically be an operation of triggering a swipe left/right control. When the first operation is triggered on the first interface 210, the first interface 210 and a preset second interface 230 are controlled to move in the first direction, and the second interface 230 is controlled to be displayed in the target area, wherein the first direction may specifically be a horizontal direction. Specifically, if the first operation is a swipe left operation or an operation of triggering a swipe left control, the first direction corresponds to a leftward direction, and if the first operation is a swipe right operation or an operation of triggering a swipe right control, the first direction corresponds to a rightward direction. It can be understood that, if the first operation is the swipe left operation or the operation of triggering the swipe left control, the first direction may also correspond to the rightward direction, and if the first operation is the swipe right operation or the operation of triggering the swipe right control, the first direction may also correspond to the leftward direction.

The second interface 230 is a different interface from the first interface 210, that is, content displayed on the second interface 230 is different from content displayed on the first interface 210. The essence of the above interactive process is to switch from the first interface 210 to the second interface 230 by means of horizontal swipe, i.e. hiding the display of the first interface 210, and displaying the second interface 230 on the interactive interface. Taking an example that the first operation is to swipe left and the first direction is the leftward direction, by referring to FIG. 3 that illustrates a schematic diagram of an interactive interface transitioning from a first interface to a second interface, compared with FIG. 2, it can be seen that the first interface 210 moves leftward by some distance, and for the second interface 230 not originally displayed on the interactive interface, a portion thereof is exposed.

Figure 3:
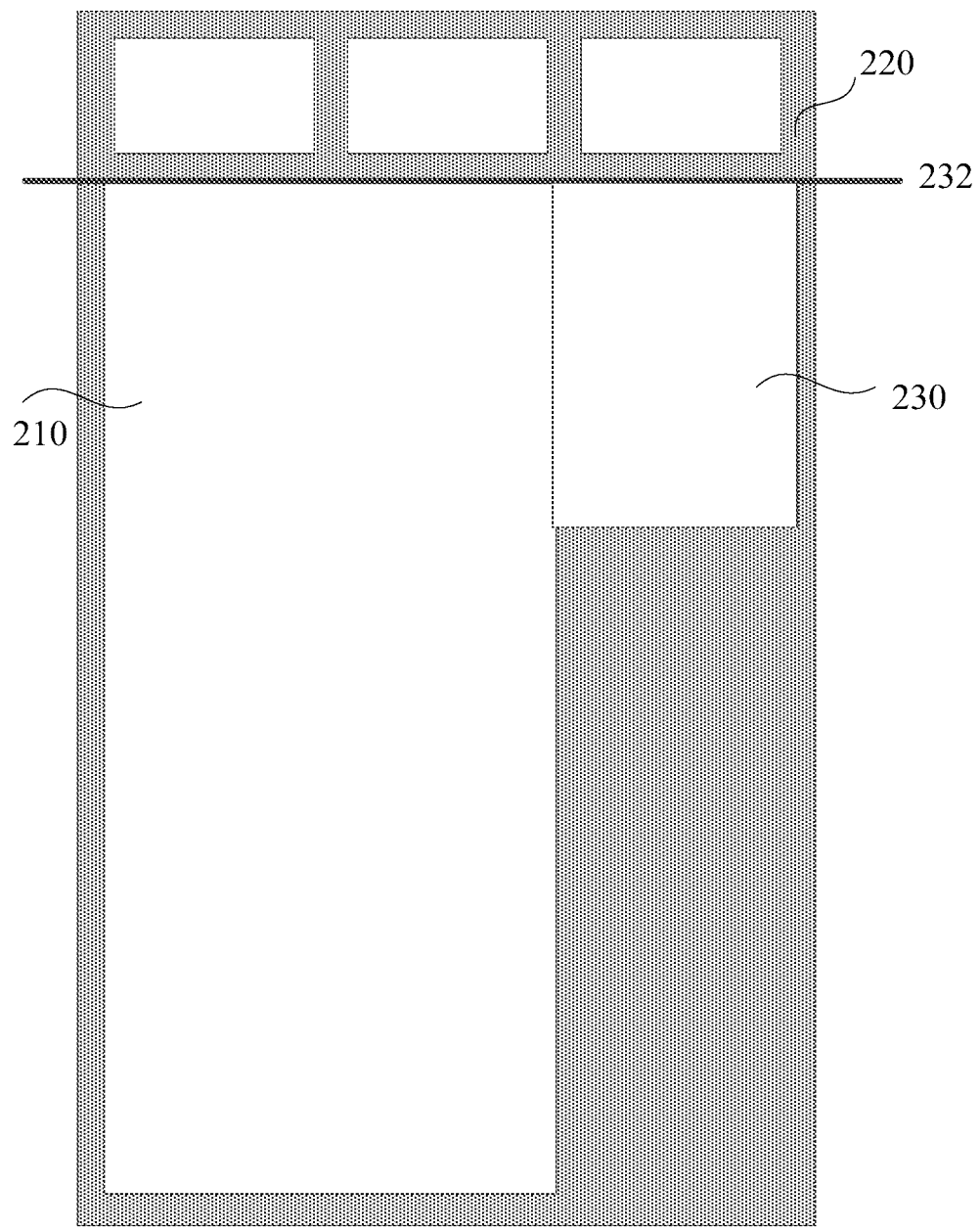
FIG. 3 is a schematic diagram of an interactive interface transitioning from a first interface to a second interface in an embodiment of the present disclosure.
Figure 4:
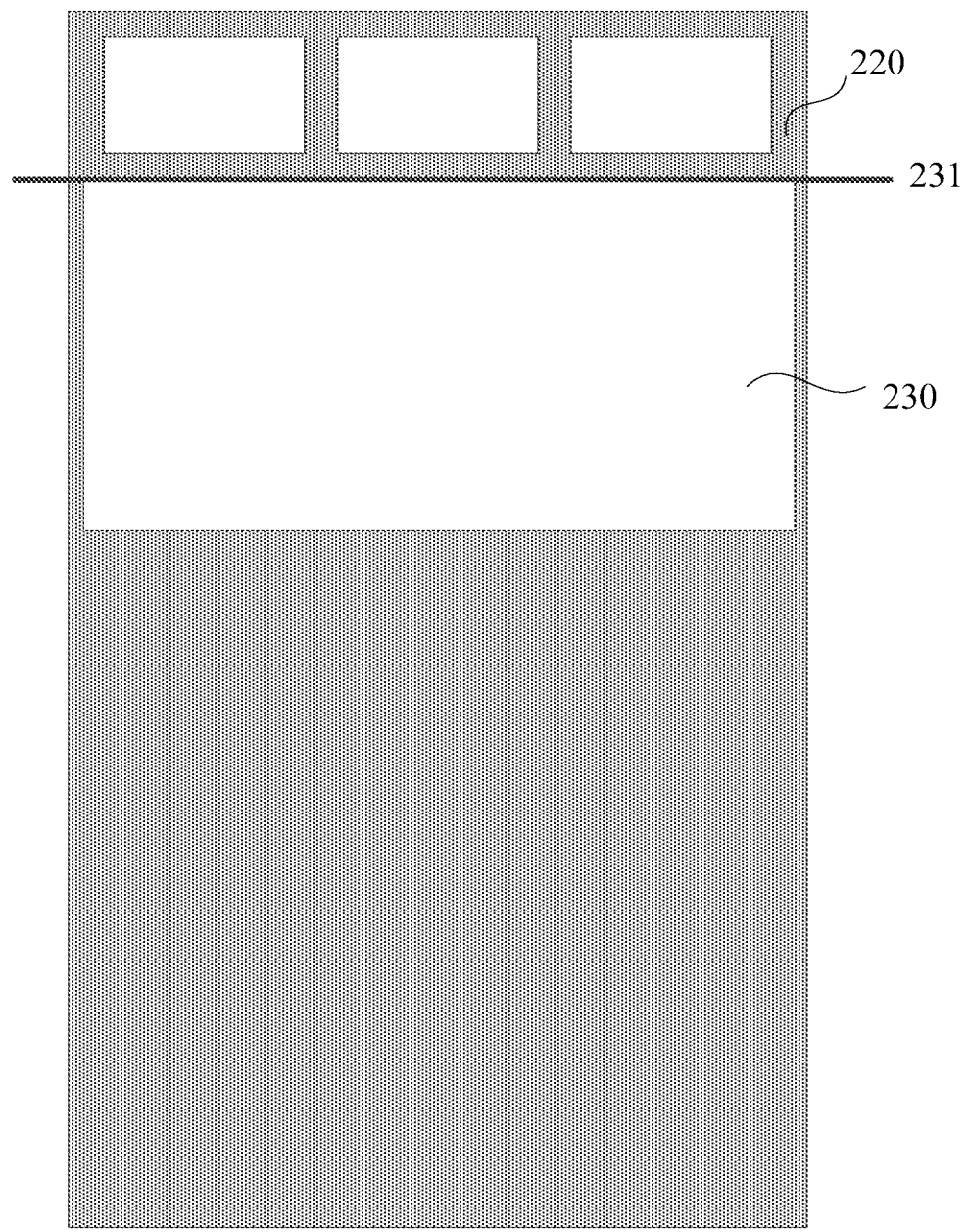
FIG. 4 is a schematic display diagram of a second interface in a first display state in an embodiment of the present disclosure.

On the basis of FIG. 3, if a user continues swipe left, he will obtain a schematic display diagram of the second interface in the first display state as shown in FIG. 4, where the second interface 230 occupies the display area of the first interface 210, so that the second interface 230 is displayed on the target area. It should be noted that, if the second interface 230 does not satisfy a preset condition, for example, content to be displayed in the second interface 230 is less, then the second interface 230 is controlled to enter the first display state, so that an upper boundary 231 of the second interface 230 is aligned with an upper boundary 232 of the target area (the upper boundary 232 of the target area is shown in FIG. 2 and FIG. 3, and in order to be displayed in a manner that being distinguished from the upper boundary 231 of the second interface 230, only the upper boundary 231 is shown in FIG. 4, but the upper boundary 232 is not shown, because the both actually coincide), that is, the second interface 230 is displayed at a relatively upper position of the interactive interface 220, so that the display effect of interaction and interaction related performance can be improved.

This is because before the second interface 230 is displayed, the first interface 210 occupies the relatively upper position of the interactive interface 220, and at this time, a sight focus of the user falls at the relatively upper position of the interactive interface 220, and if there is less content to be displayed in the second interface 230 and so the state locking is triggered, leading to, in switching from the first interface 210 to the second interface 230, the second interface 230 is directly displayed at a relatively lower position of the interactive interface 220, then a sudden change in the display interface will occur, which brings poor display effect of interaction, and further causes poor interaction related performance. However, in the display method provided in the embodiment, by changing the interactive method, in switching from the first interface 210 to the second interface 230, the upper boundary 231 of the second interface 230 is controlled to be aligned with the upper boundary 232 of the target area, so that the second interface 230 is displayed at the relatively upper position of the interaction interface 220, thereby bringing better display effect of interaction, and further improving interaction related performance.

The preset condition comprises that a height of the interface is greater than a height threshold, wherein if the preset condition is not satisfied, it is indicated that the height of the interface is not greater than the height threshold, the height of the interface is usually related to the amount of content to be displayed that is displayed in the interface, and the height threshold is related to a display height required by another interface in the interactive interface. For example, if there is a large amount of content to be displayed that needs to be displayed in the second interface, even if the second interface occupies the entire interactive interface (taking a smart phone as an example, the interactive interface generally refers to a display screen of the mobile phone), the content to be displayed cannot be completely displayed, and at this time, the interface height of the second interface may reach the height threshold. Conversely, if there is a small amount of content to be displayed that needs to be displayed in the second interface, the interface height of the second interface is determined according to the content to be displayed, and is a value less than the height threshold.

Step 120, in response to a second operation acting on the second interface in the first display state, controlling the second interface to move in a second direction, the second interface entering a second display state from the first display state to change a display position of the second interface in the target area, wherein, the second direction is perpendicular to the first direction.

In an implementation, the second operation includes a vertical swipe operation, such as a swipe up operation, an operation of triggering a swipe up control, a swipe down operation, or an operation of triggering a swipe down control. If the second operation is the swipe up operation or the operation of triggering the swipe up control, the second direction is the upward direction, and if the second operation is the swipe down operation or the operation of triggering the swipe down control, the second direction is the downward direction. It can be understood that when the second operation is the swipe up operation or the operation of triggering the swipe up control, the second direction may also be the downward direction, and when the second operation is the swipe down operation or the operation of triggering the swipe down control, the second direction may also be the upward direction. Taking an example that the second operation is the swipe down operation or the operation of triggering the swipe down control and the second direction is the downward direction, if swiping down the second interface 230 shown in FIG. 4, the second interface 230 is controlled to move downwards, the second interface 230 enters the second display state from the first display state to change the display position of the second interface 230 in the target area, that is, the upper boundary 231 of the second interface 230 in the second display state is no longer aligned with the upper boundary 232 of the target area, the second interface 230 is no longer displayed at the relatively upper position of the target area, but moves downwards following the swipe down operation, and is displayed at the relatively lower position of the target area. Correspondingly, reference can be made to a schematic display diagram of the second interface in the second display state as shown in FIG. 5, where the second interface 230, the upper boundary 231 of the second interface 230, the upper boundary 232 of the target area, and the interactive interface 220 are included, wherein the upper boundary 231 of the second interface 230 is less than a preset height 233.

Figure 5:
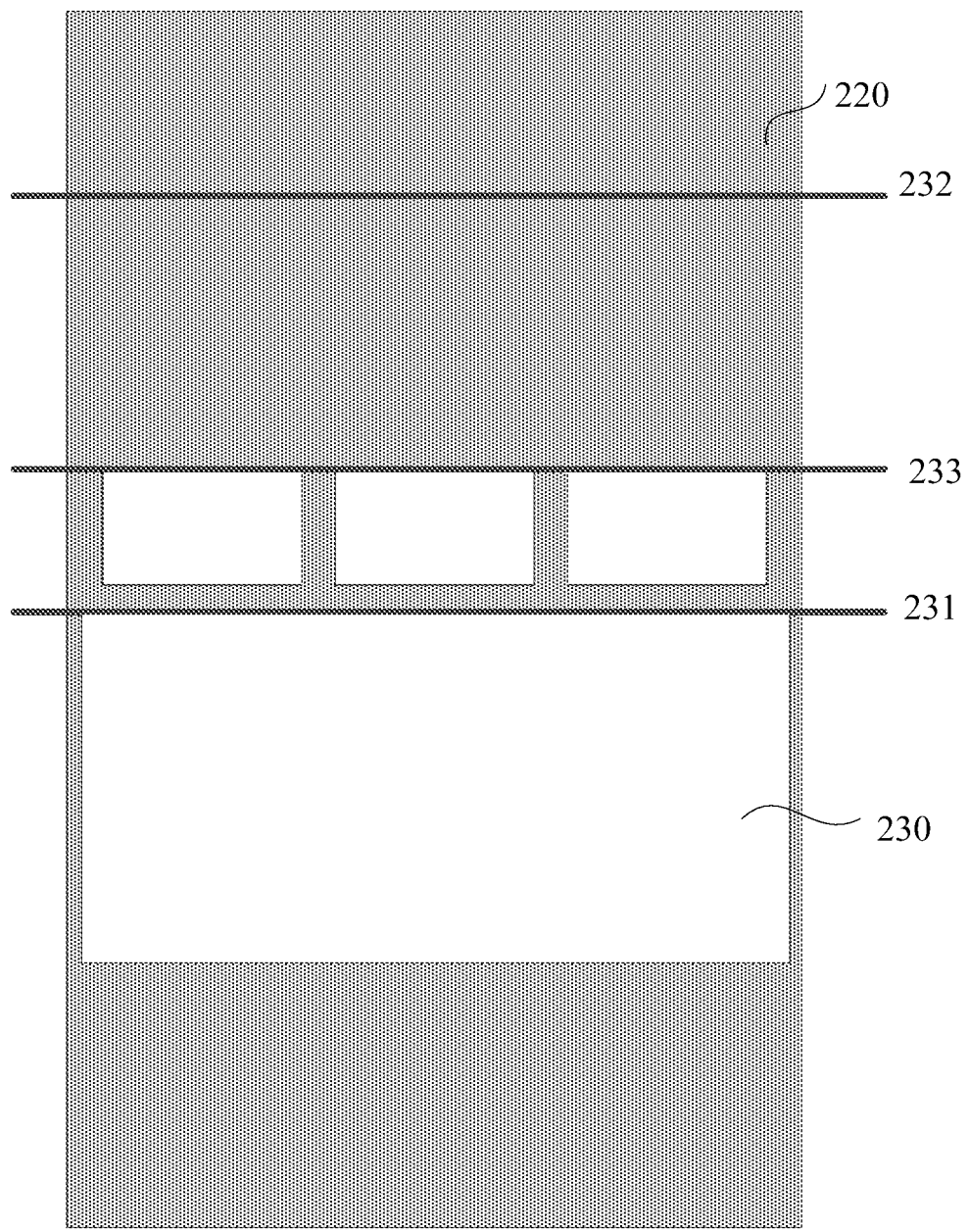
FIG. 5 is a schematic display diagram of a second interface in a second display state in an embodiment of the present disclosure.

In switching from the first interface as shown in FIG. 2 to the second interface as shown in FIG. 5, by adding a transition interface as shown in FIG. 4, better display effect of interaction and interaction related performance can be obtained.

Step 130, triggering a state locking in the second display state, to limit the second interface to return from the second display state to the first display state.

That is, no matter what interaction operation (including the swipe up operation, the swipe down operation, the swipe left operation, and the swipe right operation) is triggered on the second interface in the second display state (as shown in FIG. 5), the second interface does not directly return to the first display state (as shown in FIG. 4). By triggering the state locking, it is possible to avoid interactive confusion and avoid falling into invalid circular interactions, which is beneficial for improving the display effect of interaction, interaction related performance and the interactive efficiency.

According to the display method provided by the embodiments of the present disclosure, by triggering the state locking in the second display state to limit the second interface to return from the second display state to the first display state, the purposes of avoiding interactive confusion and avoiding falling into invalid circular interactions are achieved, which is beneficial for improving the display effect of interaction, interaction related performance and the interactive efficiency.

Figure 6:
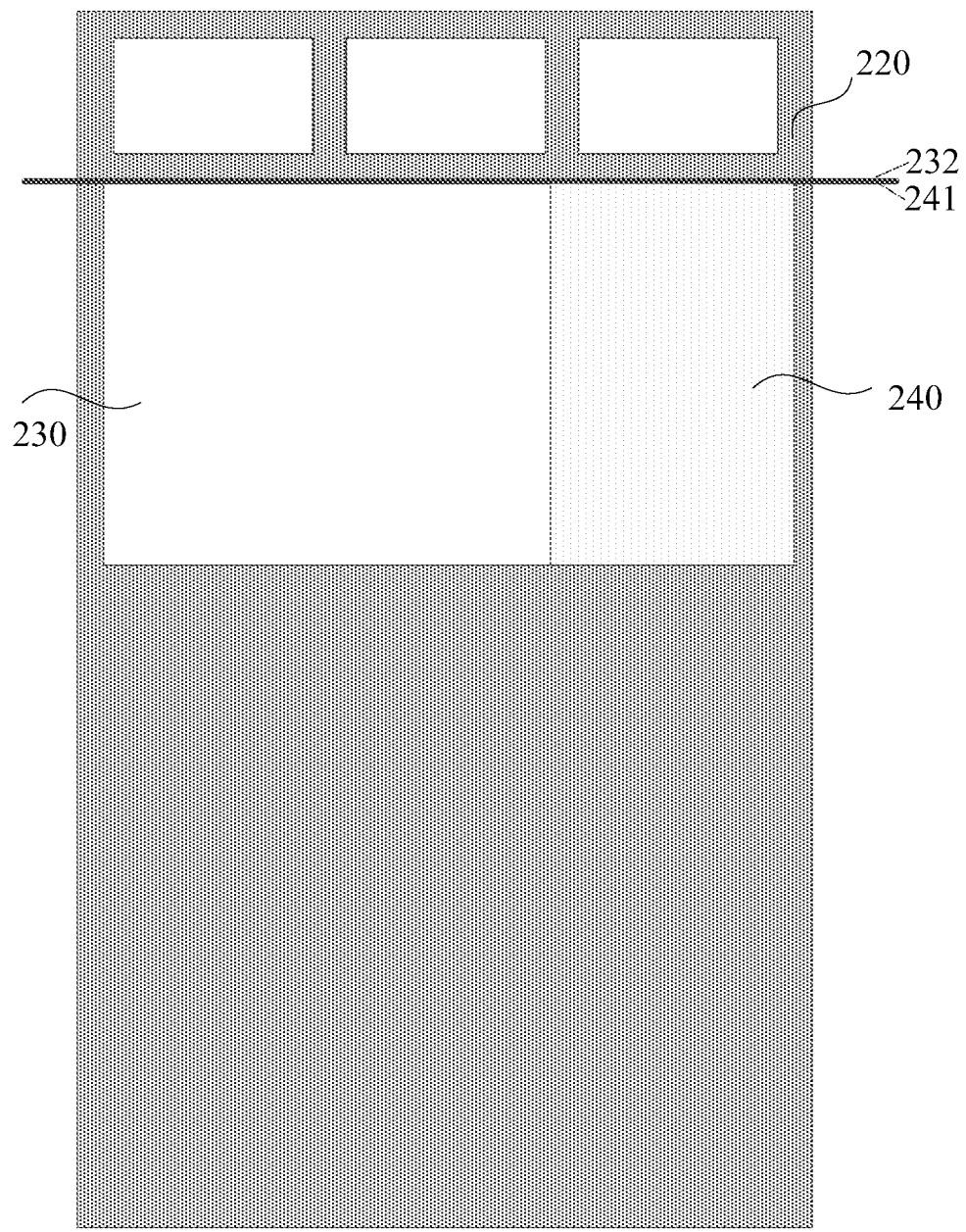
FIG. 6 is a schematic diagram of an interactive interface transitioning from a second interface to a third interface in an embodiment of the present disclosure.
Figure 7:
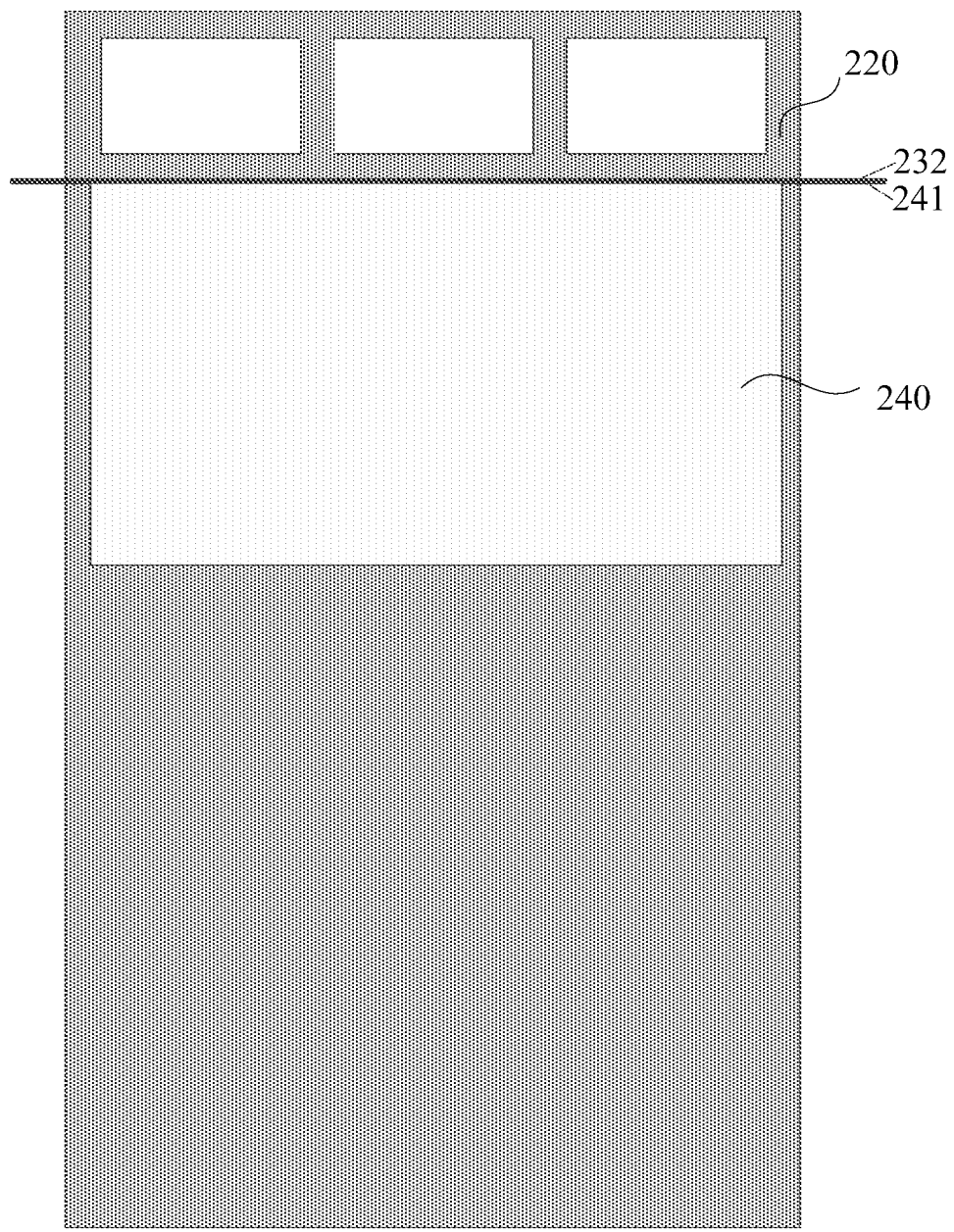
FIG. 7 is a schematic display diagram of a third interface in a third display state in an embodiment of the present disclosure.
Figure 8:
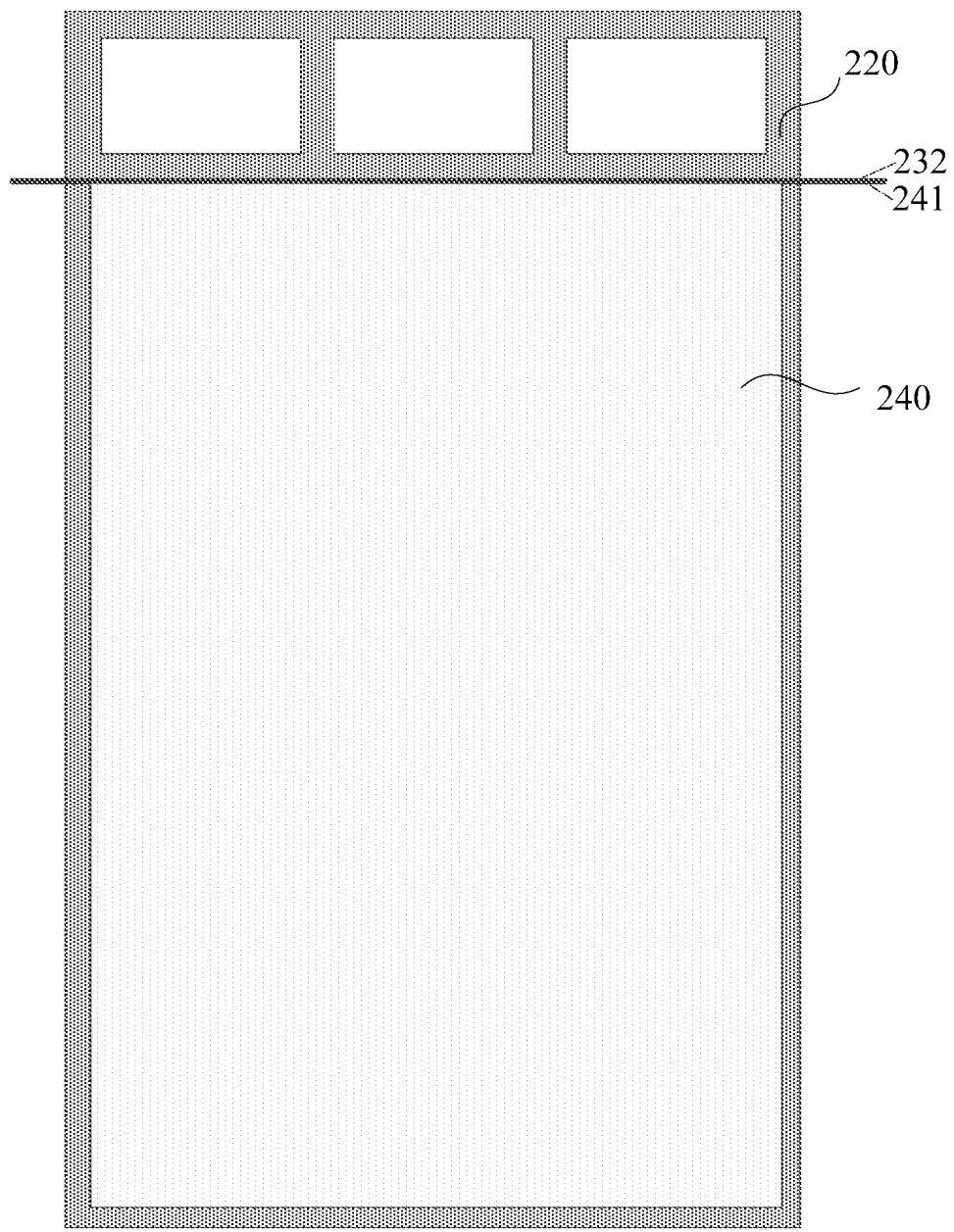
FIG. 8 is a schematic display diagram of a third interface in an embodiment of the present disclosure.

On the basis of the above embodiments, in an implementation, the display method further comprises: in response to a first operation acting on the second interface in the first display state, controlling the second interface and a preset third interface to move in the first direction, and controlling the third interface to be displayed in the target area so that the third interface enters a third display state, an upper boundary of the third interface in third display state being aligned with the upper boundary of the target area. That is, if swiping left/right the second interface shown in FIG. 4, the second interface and the third interface move leftwards or rightwards. Taking an example that the first operation is to swipe left and the first direction is the leftward direction, by referring to a schematic diagram of an interactive interface transitioning from the second interface to the third interface as shown in FIG. 6, where the second interface 230, the third interface 240, the interactive interface 220, the upper boundary 241 of the third interface 240, and the upper boundary 232 of the target area are included, compared with FIG. 4, it can be seen that the second interface 230 moves leftwards by some distance, and for the third interface 240 not originally displayed on the interactive interface, a portion thereof is exposed. On the basis of FIG. 6, if the user continues swipe left, he will obtain a schematic display diagram of the third interface in the third display state as shown in FIG. 7, where the third interface 240 occupies the display area of the second interface 230, the third interface 240 is displayed on the target area, and the upper boundary 241 of the third interface 240 is aligned with the upper boundary 232 of the target area. It should be noted that, an example that the third interface 240 does not satisfy the preset condition is taken in FIG. 7, and the third display state in which the third interface 240 is in FIG. 7 is substantially the same as the first display state in which the second interface 230 is in FIG. 4, so that the interactive logic performed based on the second interface 230 in FIG. 4 is applicable to the third interface 240 in FIG. 7. If the third interface 240 satisfies the preset condition, a schematic display diagram of the third interface 240 is as shown in FIG. 8, where the third interface 240 occupies the entire target area, its display state being substantially the same as that of the first interface 210 shown in FIG. 2, so that the interactive logic performed based on the first interface 210 in FIG. 2 is applicable to the third interface 240 in FIG. 8.

In summary, when swiping left/right the second interface 230 in FIG. 4, by aligning the upper boundary 241 of the third interface 240 with the upper boundary 232 of the target area, the same display method as FIG. 4 is maintained, which can improve the display effect of interaction and interaction related performance, because the upper boundary 231 of the second interface 230 is aligned with the upper boundary 232 of the target area in FIG. 4, so that the sight focus of the user falls at the relatively upper position of the interaction interface 220, and if the third interface 240 is displayed at the relatively lower position of the interaction interface 220 in switching from the second interface 230 to the third interface 240 in FIG. 4, poor display effect of interaction will be brought, thereby leading to poor interaction related performance. However, in the display method provided by the embodiments, by changing the interactive logic, in switching from the second interface 230 of FIG. 4 to the third interface 240, the upper boundary 241 of the third interface 240 is controlled to be aligned with the upper boundary 232 of the target area, so that the third interface 240 is displayed at the relatively upper position of the interaction interface 220, which brings better display effect of interaction, thereby improving interaction related performance.

In an implementation, the display method further comprises: in response to a third operation acting on the second interface in the first display state, maintaining the second interface in the first display state. A direction of the third operation is opposite to that of the second operation. If the second operation is to swipe down or an operation of triggering a swipe down control, the third operation is to swipe up or an operation of triggering a swipe up control. In other words, if swiping up the second interface 230 shown in FIG. 4, the display state of the second interface is not changed, that is, the first display state shown in FIG. 4 is kept, because the second interface in the first display state does not satisfy the preset condition, that is, the interface height of the second interface is less than the height threshold, or in other words, the second interface has no more content to be displayed, so that even if the user swipes up the second interface, the content of the second interface will not be refreshed, and the display state of the second interface will not be changed, to obtain better display effect of interaction and interaction related performance.

Figure 9:
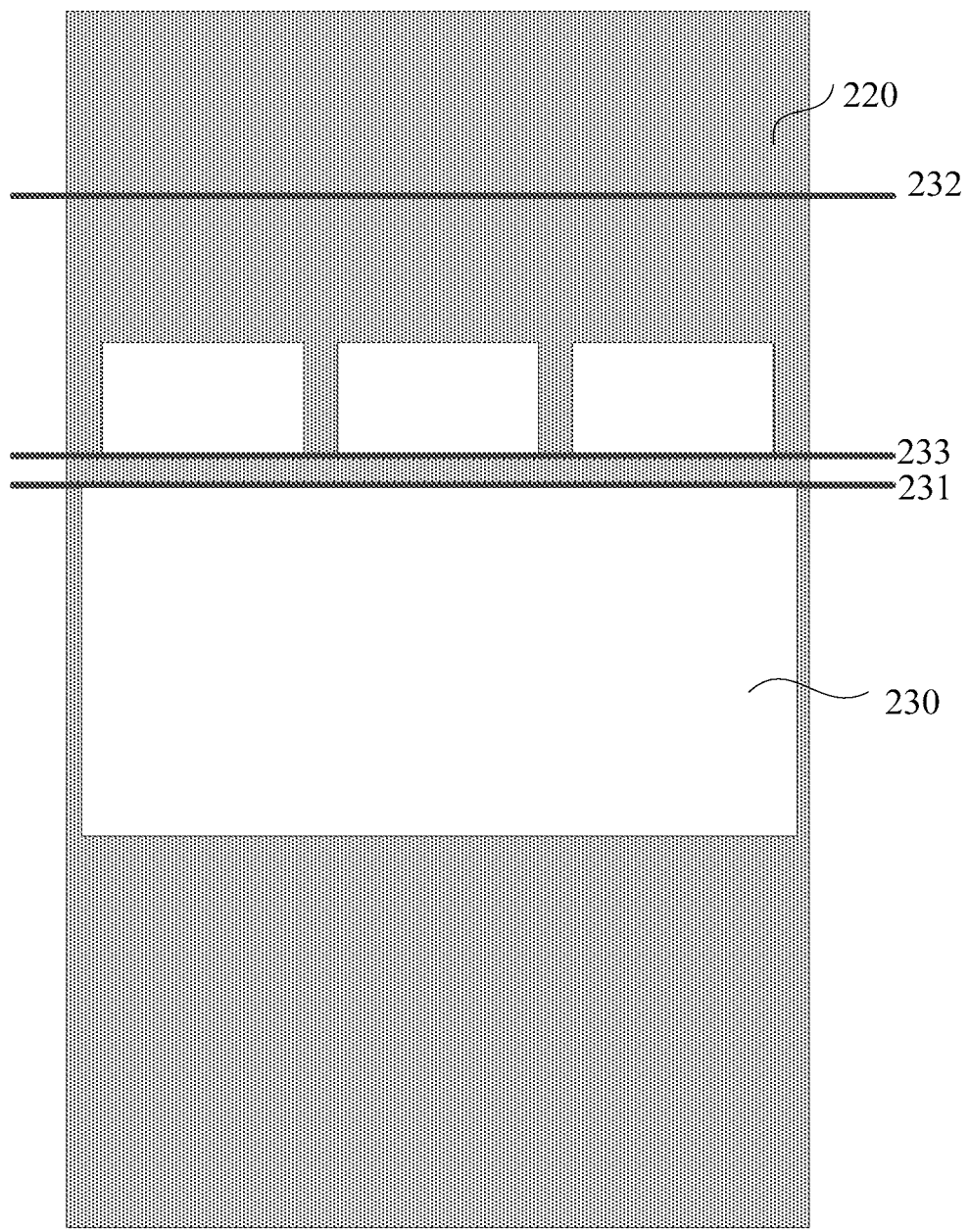
FIG. 9 is a schematic display diagram of a second interface in a second display state in an embodiment of the present disclosure.

In an implementation, the controlling the second interface to move in a second direction, the second interface entering the second display state from the first display state, comprises: controlling the second interface to move in the second direction, so that in the second display state, a first height of the upper boundary of the second interface is less than a preset height, the preset height being less than a second height at which the upper boundary of the target area is located. Referring to FIGS. 4 and 5, if swiping down the second interface 230 in FIG. 4, the second interface 230 is controlled to move downwards and finally reach the second display state as shown in FIG. 5, where the first height at which the upper boundary 231 of the second interface 230 is located is less than the preset height 233, and the preset height 233 is less than the second height at which the upper boundary 232 of the target area is located. A schematic display diagram after swiping up the second interface in the second display state may also be as shown in FIG. 9, and by comparing FIG. 9 and FIG. 5, the first height at which the upper boundary 231 of the second interface 230 in FIG. 9 is located is greater than the first height at which the upper boundary 231 of the second interface 230 in FIG. 5 is located, but the both are less than the second height at which the upper boundary 232 of the target area is located and are less than the preset height 233.

Figure 10:
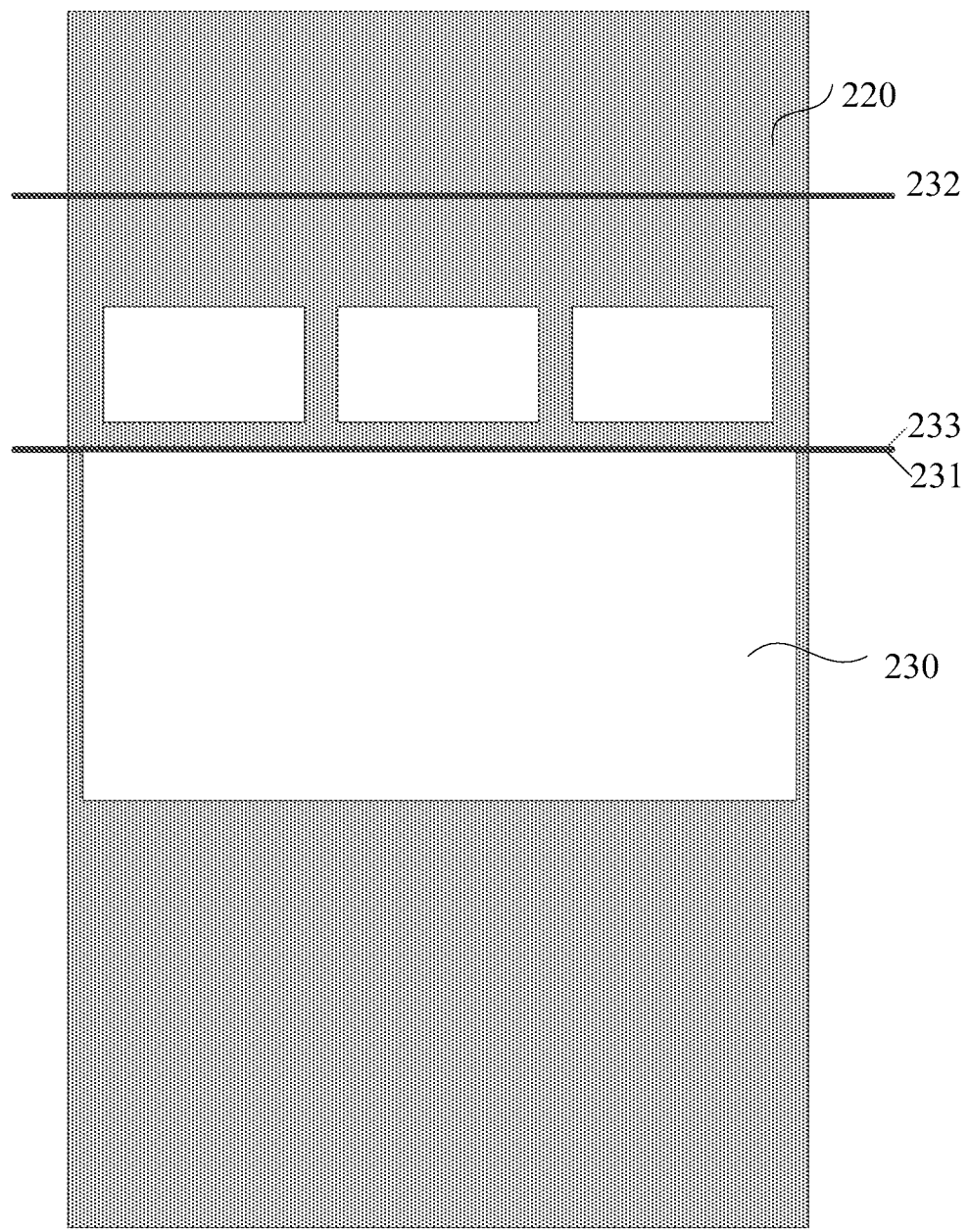
FIG. 10 is a schematic display diagram of a second interface in an embodiment of the present disclosure.

Further, in an implementation, after the second interface enters the second display state from the first display state, the display method further comprises: in response to a third operation acting on the second interface, controlling the second interface to move in a third direction, so that a third height at which the upper boundary of the second interface is located is greater than the first height at which the upper boundary of the second interface in the second display state is located, and the third height is less than the preset height, wherein the third direction is opposite to the second direction, and the preset height is less than the second height at which the upper boundary of the target area is located. Specifically, when the height of the second interface 230 is equal to the preset height, if swiping up the second interface 230 shown in FIG. 5, the interactive interface is controlled to maintain the current state; and when the height of the second interface 230 is less than the preset height, if swiping up the second interface 230 shown in FIG. 5 or FIG. 9, the second interface 230 is controlled to move upwards, but cannot move to a position where the upper boundary 231 of the second interface 230 coincides with the upper boundary 232 of the target area, the third height at which the upper boundary 231 of the second interface 230 is located being less than the preset height 233, and the preset height 233 being less than the second height at which the upper boundary 232 of the target area is located. For example, if swiping up the second interface 230 shown in FIG. 5 or FIG. 9, a schematic display diagram of the second interface as shown in FIG. 10 can be obtained, where the third height at which the upper boundary 231 of the second interface 230 is located is greater than the first height at which the upper boundary 231 of the second interface 230 in FIG. 5 and FIG. 9 is located, but is not greater than the preset height 233. This setting has the advantage that the third operation triggered by the user is responded, thereby improving the display effect of interaction and interaction related performance.

Figure 11:
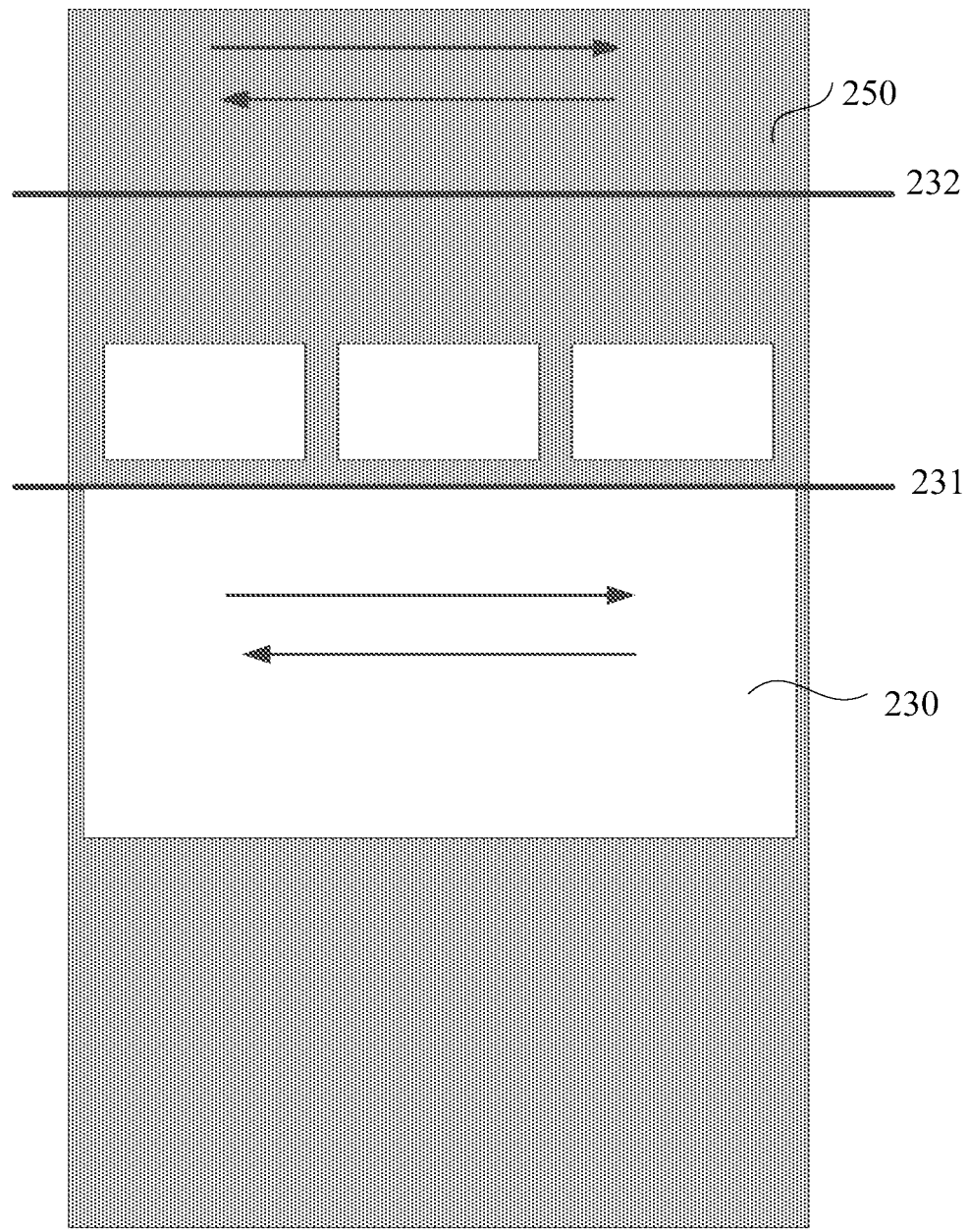
FIG. 11 is a schematic diagram of an interactive interface in an embodiment of the present disclosure.

In an implementation, the interactive interface comprises a first nested interface, the first nested interface comprises an interface to be redirected to based on the first interface by at least one first operation (e.g., the second interface, that is, the first nested interface includes the second interface), and when a height of an upper boundary of the first nested interface is less than the second height at which the upper boundary of the target area is located (e.g., the second interface in the second display state, the height of the upper boundary of the second interface being less than the second height at which the upper boundary of the target area is located), at least one second nested interface is displayed on the upper side of the first nested interface; by correspondingly referring to FIG. 11 which illustrates a schematic diagram of an interactive interface, the interactive interface comprises: a first nested interface (i.e., the second interface 230), the first nested interface (i.e., the second interface 230) being an interface to be redirected to based on the first interface 210 as shown in FIG. 2 by at least one first operation, a height of an upper boundary 231 of the first nested interface is less than the second height at which the upper boundary 232 of the target area is located, and the second nested interface 250 is displayed on the upper side of the first nested interface. An interface to be redirected to in response to a first operation for the first nested interface is different from an interface to be redirected to in response to a first operation for the second nested interface 250, i.e., an interface to be redirected to by swiping horizontally the first nested interface is different from an interface to be redirected to by swiping horizontally the second nested interface 250.

Figure 12:
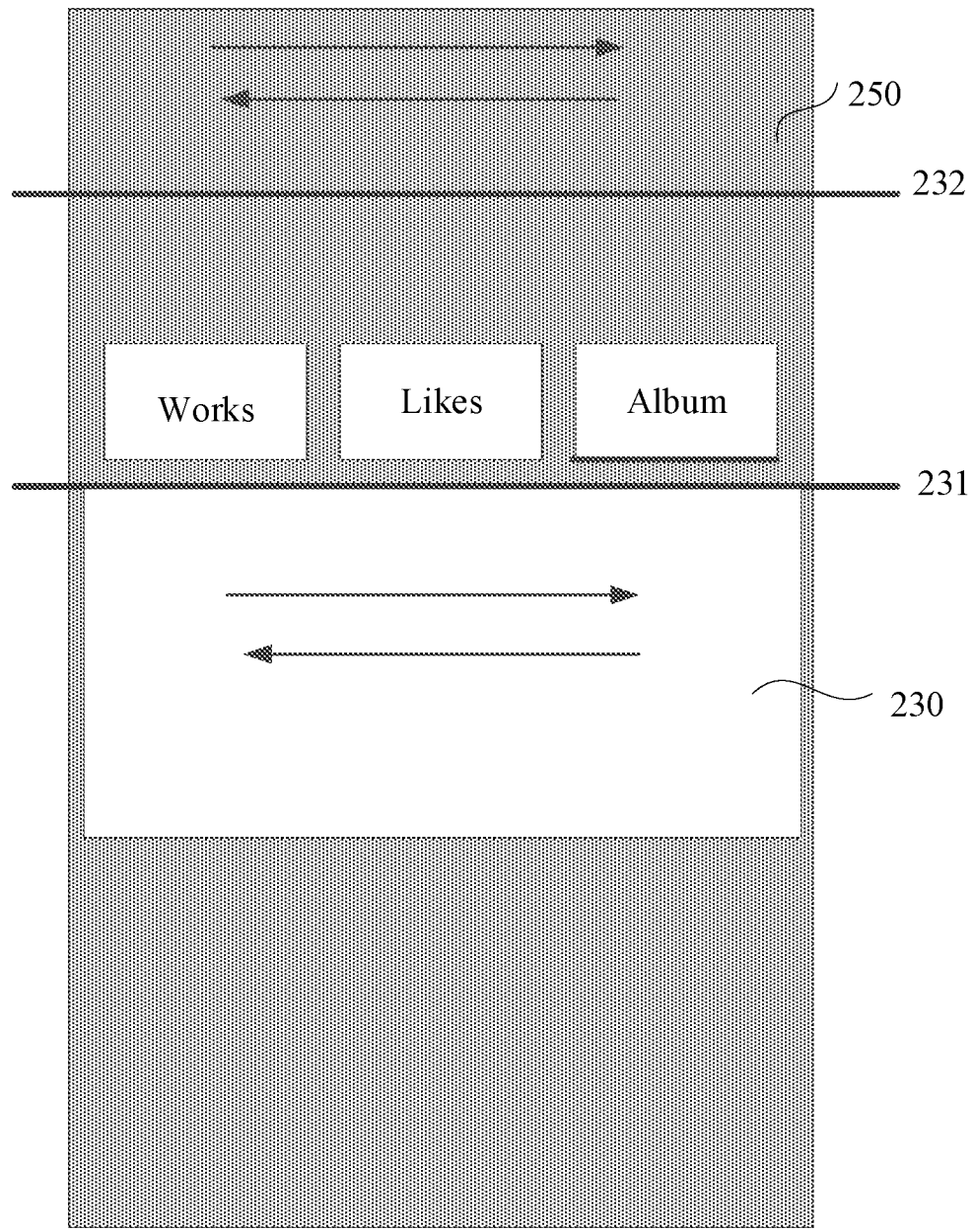
FIG. 12 is a schematic diagram of an interactive interface in an embodiment of the present disclosure.
Figure 13:
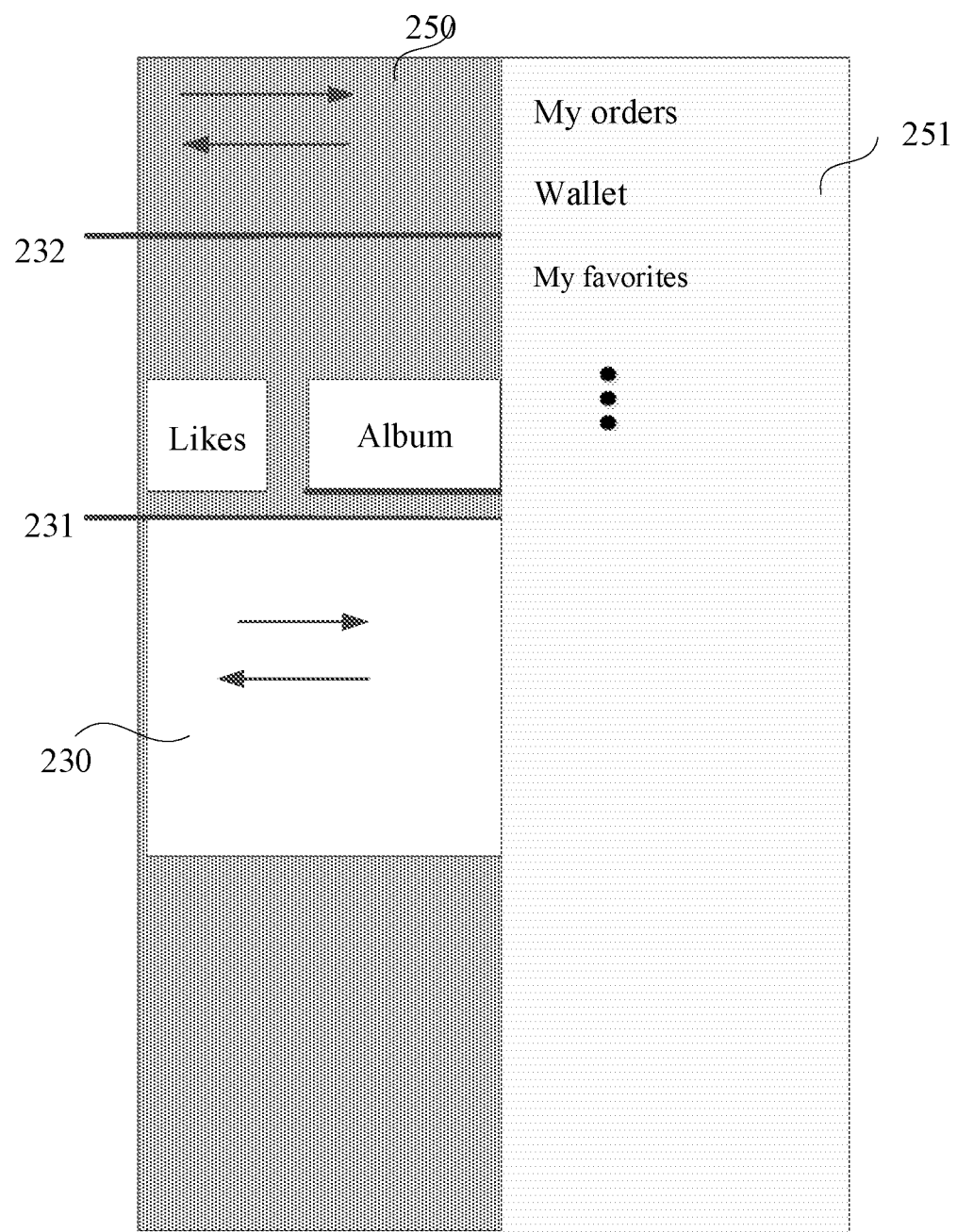
FIG. 13 is a schematic diagram of an interface to be redirected to when swiping left a second nested interface in an embodiment of the present disclosure.

The above content is illustrated by taking an example that the display method provided by the present embodiment is applied to a personal homepage; with reference to a schematic diagram of an interactive interface as shown in FIG. 12, there is a first nested interface on the upper side of which a second nested interface 250 is displayed; the first nested interface 230 is an interface corresponding to an "album" label; if swiping left the first nested interface 230, then it is redirected to an interface corresponding to a "likes" label, whereas if swiping left the second nested interface 250, then it is redirected to a new interface 251, specifically, an interface including "my orders, wallet, my favorites . . . ", and the like, as shown in FIG. 13, which illustrates a schematic diagram of an interface to be redirected to when swiping left the second nested interface 250. Further, an interface to be redirected to in response to a second operation for the first nested interface 230 is the same as an interface to be redirected to in response to a second operation for the second nested interface 250; and an interface 230 to be redirected to in response to a third operation for the first nested interface 230 is the same as an interface to be redirected to in response to a third operation for the second nested interface 250. That is, an interface to be redirected to when swiping up/down the first nested interface 230 is the same as an interface to be redirected to when swiping up/down the second nested interface 250. Correspondingly, after the second interface enters the second display state from the first display state, if swiping up the second interface, the second interface is controlled to move upwards, so that the third height at which the upper boundary of the second interface is located is greater than the first height at which the upper boundary of the second interface in the second display state is located, and the third height is less than the preset height, wherein the preset height can be specifically a difference between a total height of the interactive interface and a minimum height required for complete display of the second nested interface. The complete display of the second nested interface may refer to complete display of preset elements displayed on the second nested interface, wherein the preset elements may include, for example, "works", "likes", and "album" labels as shown in FIG. 12, and may further include content such as a personal avatar and a nickname, which may be determined according to specific settings of an application scenario.

Figure 14:
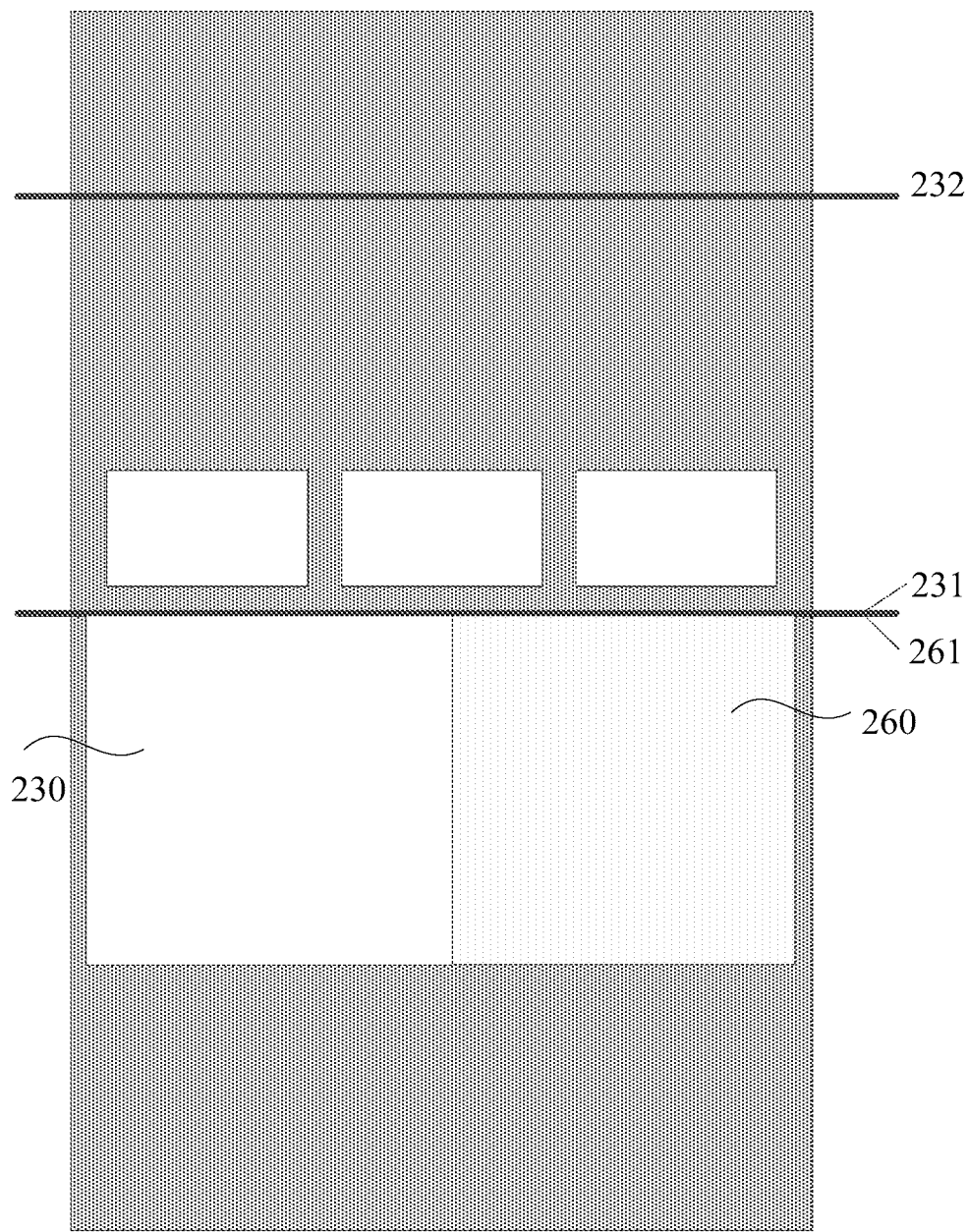
FIG. 14 is a schematic diagram of an interface in an embodiment of the present disclosure.
Figure 15:
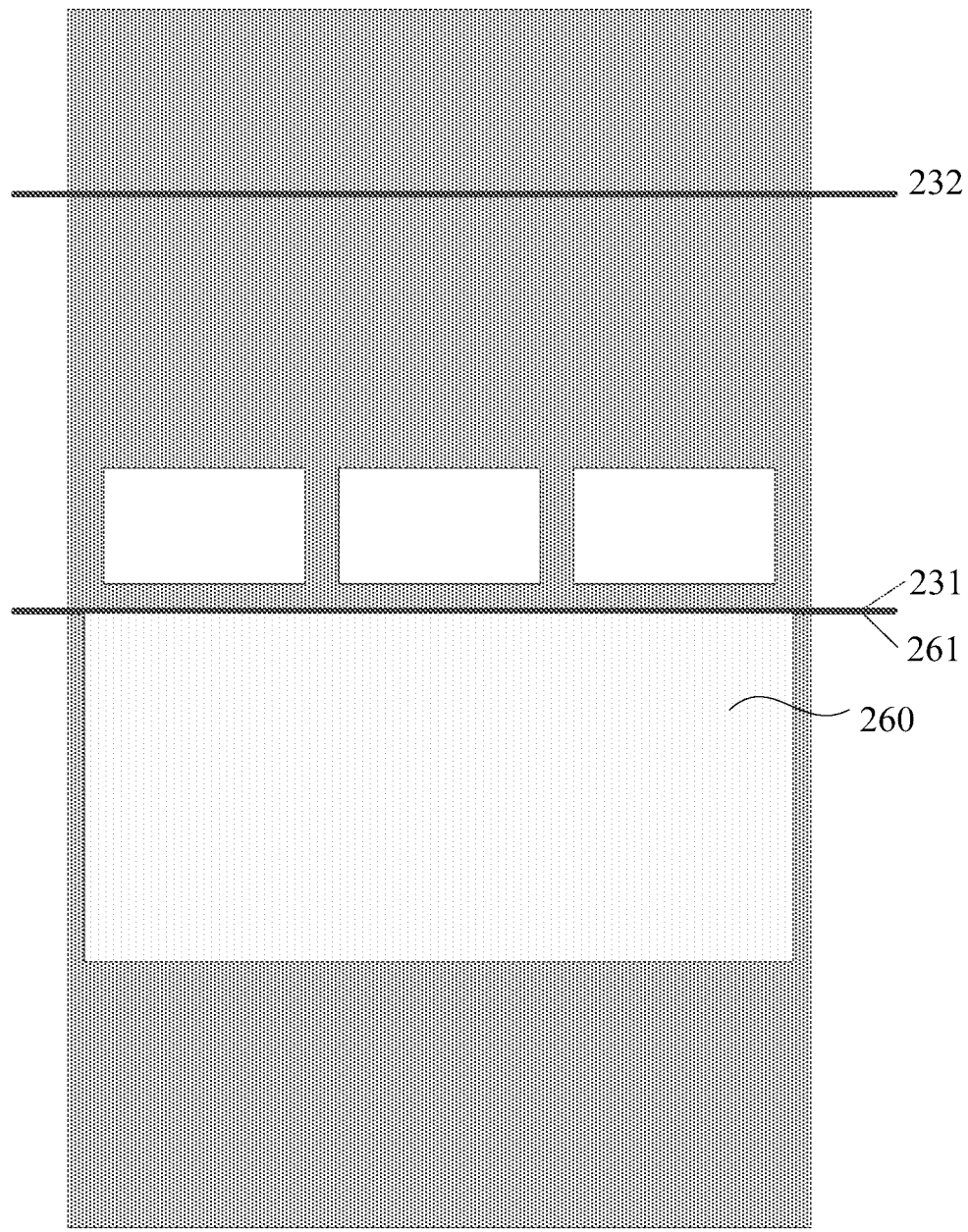
FIG. 15 is a schematic display diagram of a fourth interface in a fourth display state in an embodiment of the present disclosure.

In an implementation, after the second interface enters the second display state from the first display state, the display method further comprises: in response to a first operation acting on the second interface, controlling the second interface and a preset fourth interface to move in the first direction, and controlling the fourth interface to be displayed in the target area so that the fourth interface enters a fourth display state, an upper boundary of the fourth interface in the fourth display state being aligned with the first height at which the upper boundary of the second interface in the second display state is located. Specifically, by taking FIG. 5 as an example, if swiping left the second interface 230 in FIG. 5, the second interface 230 and the preset fourth interface are controlled to move leftwards; as shown in FIG. 14, where the second interface 230 and the preset fourth interface 260 are included, the upper boundary 261 of the fourth interface is aligned with the first height at which the upper boundary 231 of the second interface in the second display state is located; compared with FIG. 5, it can be seen that the second interface 230 moves leftwards by some distance, and for the fourth interface 260 not originally displayed on the interactive interface, a portion thereof is exposed. On the basis of FIG. 14, if the user continues swipe left, the fourth interface is controlled to be displayed in the target area, so that the fourth interface enters the fourth display state, the upper boundary of the fourth interface in the fourth display state being aligned with the first height at which the upper boundary of the second interface in the second display state is located, as shown in FIG. 15, which illustrates a schematic display diagram of the fourth interface in the fourth display state, where the fourth interface 260 occupies the display area of the second interface 230, the fourth interface 260 is displayed on the target area, and the upper boundary 261 of the fourth interface 260 is aligned with the first height at which the upper boundary 231 of the second interface in the second display state is located.

Figure 16:
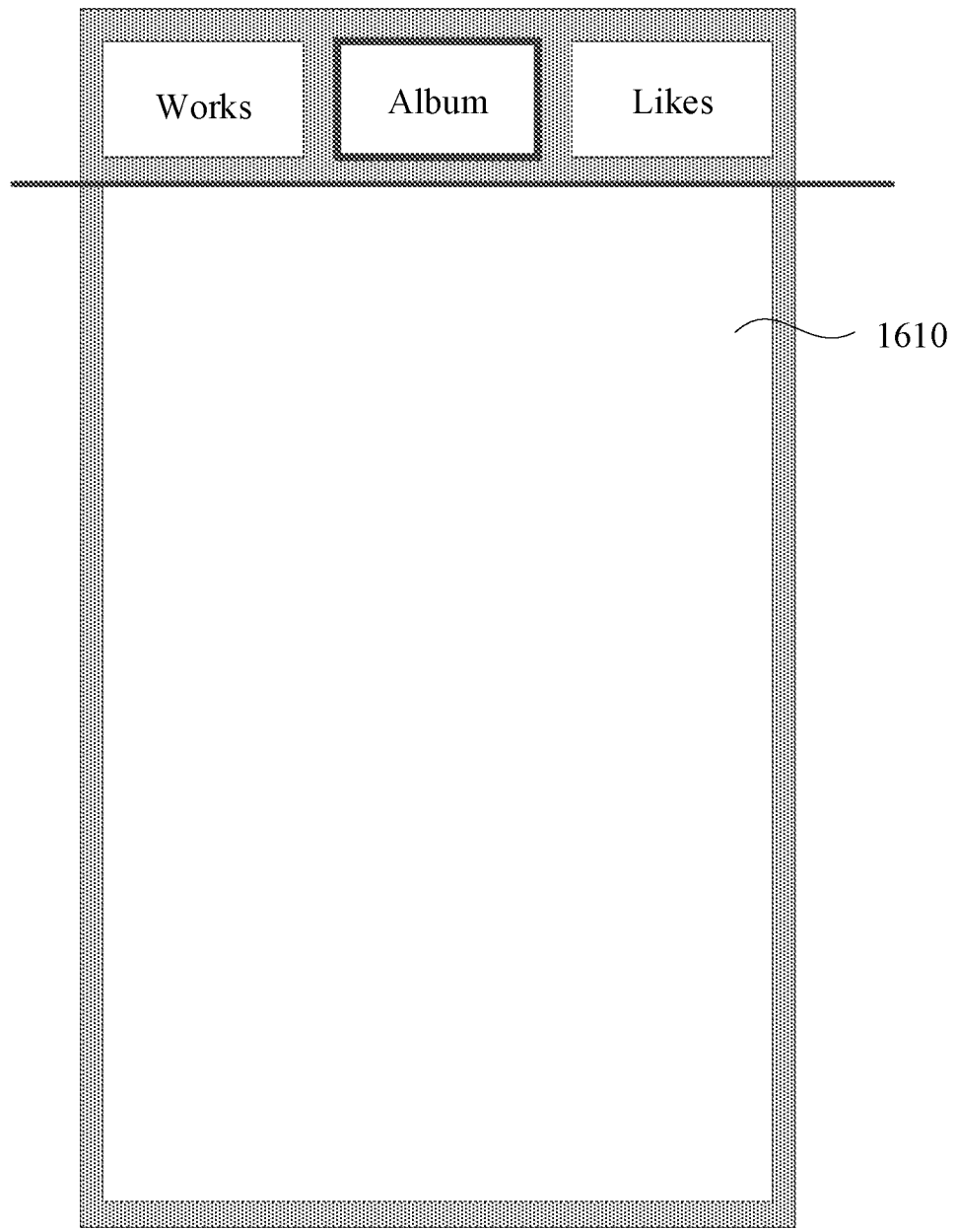
FIG. 16 is a schematic display diagram of a first interface in an embodiment of the present disclosure.
Figure 17:
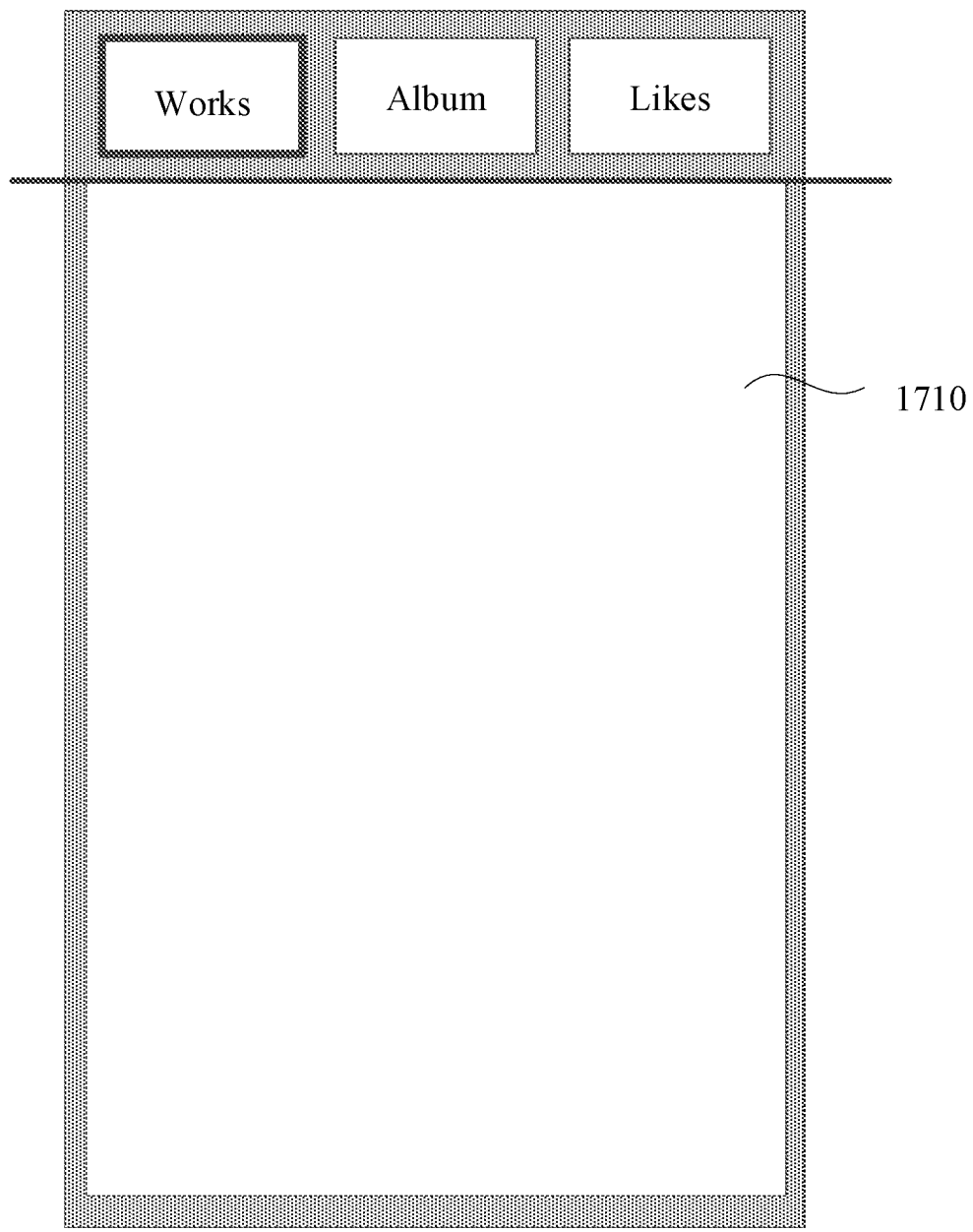
FIG. 17 is a schematic display diagram of a second interface in an embodiment of the present disclosure.
Figure 18:
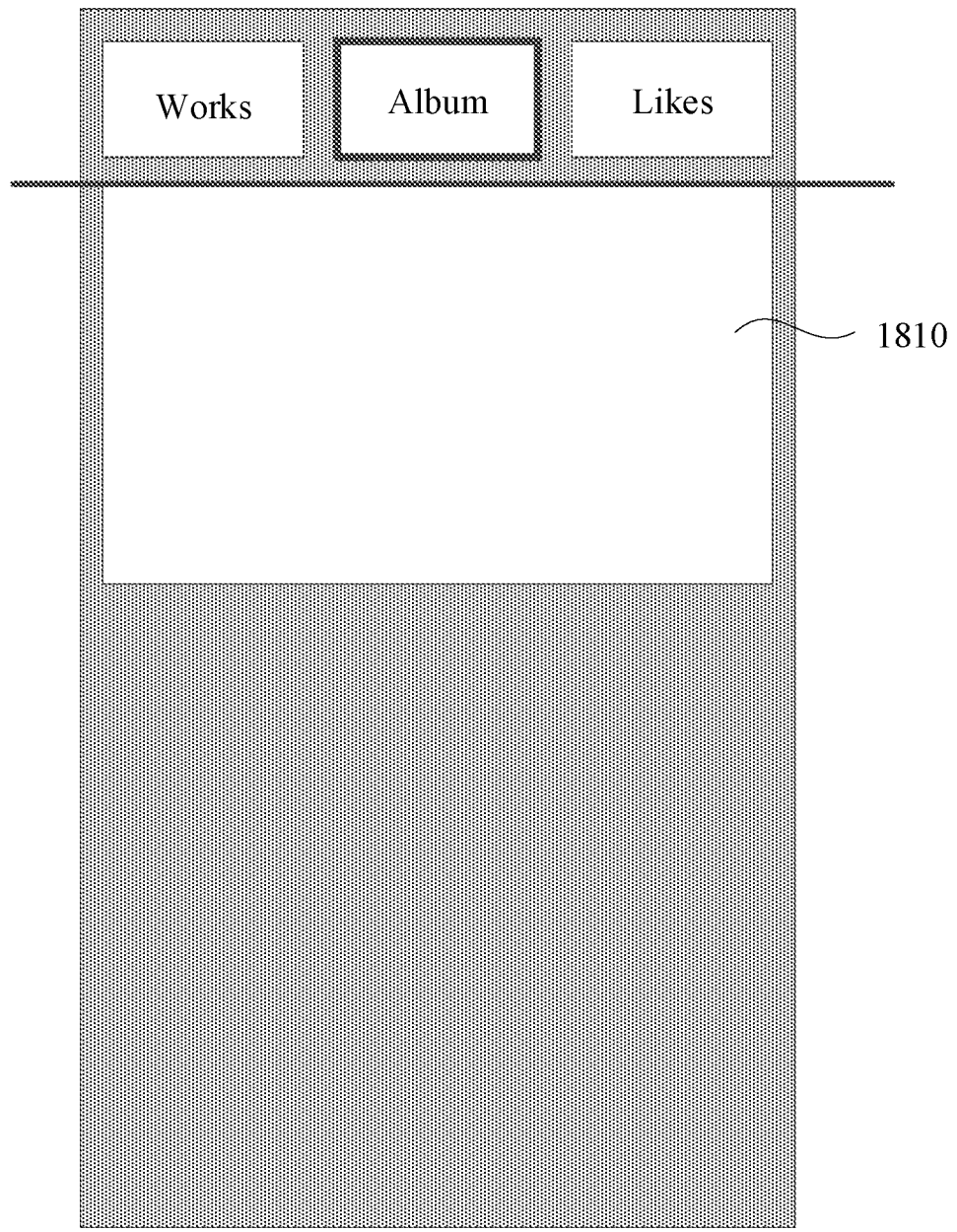
FIG. 18 is a schematic diagram of a first interface not satisfying a preset condition in an embodiment of the present disclosure.

It should be noted that, if the second interface satisfies the preset condition, the second interface is capable of returning to any previous state. Specifically, the description is made in conjunction with a specific application scenario, where it is assumed that the display method of the embodiments is applied to a personal homepage, and the first interface is an interface corresponding to an "album" label on the personal homepage, as shown in FIG. 16, where the first interface 1610 satisfies the preset condition, and if swiping left the first interface 1610, then switch to an interface under a "works" label, for example, the second interface; if the second interface satisfies the preset condition, then switch to a schematic diagram of the second interface as shown in FIG. 17, and if swiping right the second interface 1710, then it is possible to return to the first interface shown in FIG. 16 again. Since both the first interface 1610 and the second interface 1710 satisfy the preset condition, if swiping up the first interface 1610 or swiping up the second interface 1710, the first interface 1610 or the second interface 1710 is turned upwards to update the displayed content. Further, reference is made to FIG. 18, which illustrates a schematic diagram of a first interface not satisfying a preset condition, where if swiping left the first interface 1810, if the corresponding second interface satisfies the preset condition, a schematic diagram of the second interface to be redirected to is shown in FIG. 17, and at this time, by swiping right the second interface 1710, it is still possible to return to the first interface 1810 shown in FIG. 18. That is, if the second interface satisfies the preset condition, the second interface is able to return to any previous state.

In an implementation, how to determine whether the operation triggered by the user based on the interactive interface is the swipe up operation, the swipe down operation, the swipe left operation, or the swipe right operation is described. Specifically, an upper left corner of the interactive interface may be marked as a coordinate origin (0,0); when the user clicks the interactive interface, a coordinate (downX, downY) of a position clicked by the user is recorded, and when a finger of the user moves, a coordinate (moveX, moveY) of the position after the movement is recorded; assuming that deltaX=moveX−downX, and deltaY=moveY−downY, if |deltaX|>mTouchSlop (mTouchSlop is an assumed maximum tolerance distance when the interactive operation is click rather than swipe) or |deltaY|>mTouchSlop, it is determined that the current operation is the swipe operation rather than the click operation. Further, if |deltaX|>|deltaY|, then it is determined that the current operation is horizontal swipe; and if |deltaY|>|deltaX|, it is determined that the current operation is vertical swipe. If |deltaY|>|deltaX| and deltaY is a negative number, it is determined that the current operation is to swipe up; and if |deltaY|>| deltaX and deltaY is a positive number, it is determined that the current operation is to swipe down. Similarly, if |deltaX|>|deltaY| and deltaX is a negative number, it is determined that the current operation is to swipe left; and if |deltaX|>|deltaY| and deltaX is a positive number, it is determined that the current operation is to swipe right.

Figure 19:
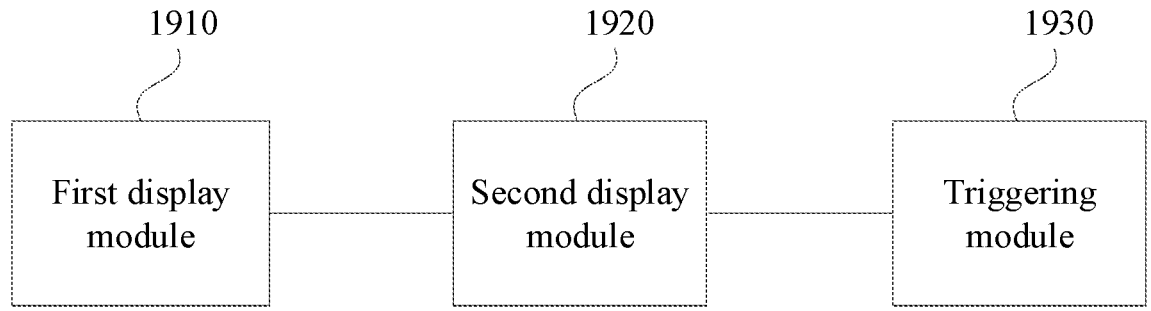
FIG. 19 is a schematic structural diagram of a display apparatus in an embodiment of the present disclosure.

FIG. 19 is a schematic structural diagram of a display apparatus in an embodiment of the present disclosure. The display apparatus provided by the embodiment of the present disclosure may be configured in a client, and the display apparatus specifically comprises:

a first display module 1910 configured to, in response to a first operation acting on a first interface being displayed on a target area of an interactive interface, control the first interface and a preset second interface to move in a first direction, and control the second interface to be displayed in the target area, wherein if the second interface does not satisfy a preset condition, control the second interface to enter a first display state, so that an upper boundary of the second interface is aligned with an upper boundary of the target area; a second display module 1920 configured to, in response to a second operation acting on the second interface in the first display state, control the second interface to move in a second direction, the second interface entering a second display state from the first display state to change a display position of the second interface in the target area, wherein, the second direction is perpendicular to the first direction; and a triggering module 1930 configured to trigger a state locking in the second display state, to limit the second interface to return from the second display state to the first display state.

Optionally, the display apparatus further comprises: a third display module configured to, in response to a first operation acting on the second interface in the first display state, control the second interface and a preset third interface to move in the first direction, and control the third interface to be displayed in the target area so that the third interface enters a third display state, an upper boundary of the third interface in the third display state being aligned with the upper boundary of the target area.

Optionally, the display apparatus further comprises: a first control module configured to, in response to a third operation acting on the second interface in the first display state, control the second interface to maintain the first display state, wherein a direction of the third operation is opposite to that of the second operation.

Optionally, the second display module 1920 comprises a control unit configured to control the second interface to move in the second direction, so that a first height at which the upper boundary of the second interface in the second display state is located is less than a preset height, the preset height being less than a second height at which the upper boundary of the target area is located.

Optionally, the display apparatus further comprises: a second control module configured to, after the second interface enters the second display state from the first display state, in response to a third operation acting on the second interface, control the second interface to move in a third direction, so that a third height at which the upper boundary of the second interface is located is greater than the first height at which the upper boundary of the second interface in the second display state is located, and the third height is less than the preset height, wherein the third direction is opposite to the second direction.

Optionally, the interactive interface comprises a first nested interface, the first nested interface comprising an interface to be redirected to based on the first interface by at least one first operation, and when a height of an upper boundary of the first nested interface is less than the second height at which the upper boundary of the target area is located, at least one second nested interface being displayed on the upper side of the first nested interface, wherein an interface to be redirected to in response to a first operation for the first nested interface is different from an interface to be redirected to in response to a first operation for the second nested interface, an interface to be redirected to in response to a second operation for the first nested interface is the same as an interface to be redirected to in response to a second operation for the second nested interface, and an interface to be redirected to in response to a third operation for the first nested interface is the same as an interface to be redirected to in response to a third operation for the second nested interface.

Optionally, the preset height is a difference between a total height of the interactive interface and a minimum height required for complete display of the second nested interface.

Optionally, the first operation comprises a horizontal swipe operation or triggering a swipe left/right control, and the first direction comprises a horizontal direction. Optionally, the second operation comprises a swipe down operation or triggering a swipe down control, and the second direction comprises a downward direction. Optionally, the third operation comprises a swipe up operation or triggering a swipe up control, and the third direction comprises an upward direction. Optionally, the display apparatus further comprises: a third control module configured to, after the second interface enters the second display state from the first display state, in response to a first operation acting on the second interface, control the second interface and a preset fourth interface to move in the first direction, and control the fourth interface to be displayed in the target area, so that the fourth interface enters the fourth display state, an upper boundary of the fourth interface in the fourth display state being aligned with the first height at which the upper boundary of the second interface in the second display state is located.

Optionally, if the second interface satisfies the preset condition, the second interface is able to return to any previous state.

Optionally, the preset condition comprises that a height of the interface is greater than a height threshold.

The display apparatus provided by the embodiments of the present disclosure may perform the steps performed by the client in the display method provided by the embodiment of the present disclosure, and specific steps and the beneficial effects are not repeated again.

Figure 20:
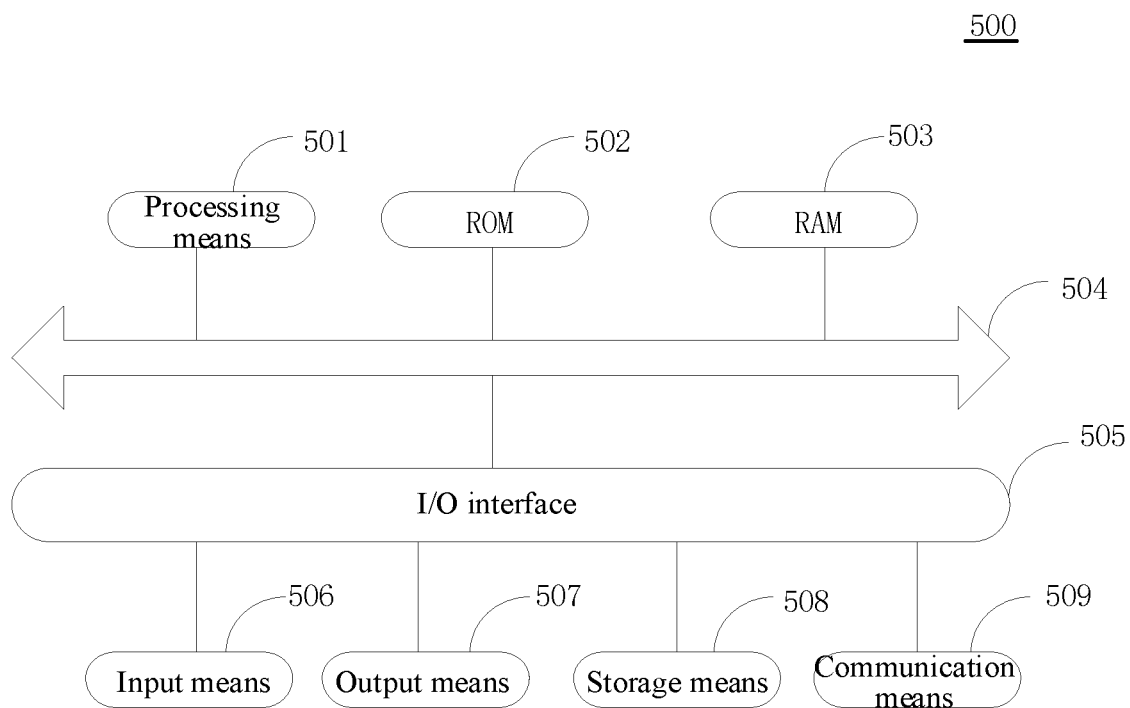
FIG. 20 is a schematic structural diagram of an electronic device in an embodiment of the present disclosure.

FIG. 20 is a schematic structural diagram of an electronic device in an embodiment of the present disclosure. Specific reference is made below to FIG. 20, which illustrates a schematic structural diagram of an electronic device 500 suitable for use in implementing the embodiments of the present disclosure. The electronic device 500 in the embodiments of the present disclosure may include, but is not limited to, mobile terminals such as a mobile phone, a notebook computer, a digital broadcast receiver, a PDA (Personal Digital Assistant), a PAD (tablet computer), a PMP (Portable Multimedia Player), a vehicle-mounted terminal (e.g., a vehicle-mounted navigation terminal), and a wearable electronic device, and fixed terminals such as a digital TV, a desktop computer, and a smart home device. The electronic device shown in FIG. 20 is only an example, and should not bring any limitation to the functions and the scope of use of the embodiments of the present disclosure.

As shown in FIG. 20, the electronic device 500 may comprise a processing means (e.g., a central processing unit, a graphics processing unit, etc.) 501 that may perform various appropriate actions and processes according to a program stored in a read-only memory (ROM) 502 or a program loaded from a storage means 508 into a random access memory (RAN) 503 to implement the display method according to the embodiments of the present disclosure. In the RAM 503, various programs and data required for the operation of the electronic device 500 are also stored. The processing means 501, the ROM 502, and the RAM 503 are connected to each other through a bus 504. An input/output (I/O) interface 505 is also connected to the bus 504.

Generally, the following means may be connected to the I/O interface 505: an input means 506 including, for example, a touch screen, touch pad, keyboard, mouse, camera, microphone, accelerometer, gyroscope, etc.; an output means 507 including, for example, a liquid crystal display (LCD), a speaker, a vibrator, etc.; a storage means 508 including, for example, a magnetic tape, hard disk, etc.;

and a communication means 509. The communication means 509 may allow the electronic device 500 to communicate with other devices wirelessly or by wire to exchange data. While FIG. 20 illustrates the electronic device 500 having various means, it should be understood that not all illustrated means are required to be implemented or provided. More or fewer devices may be alternatively implemented or provided.

In particular, according to the embodiment of the present disclosure, the processes described above with reference to the flow diagrams may be implemented as a computer software program. For example, the embodiments of the present disclosure comprises a computer program product, the computer program product comprising a computer program carried on a non-transitory computer-readable medium, the computer program containing program code for performing the method illustrated by the flow diagrams so that the method as described above is implemented. In such an embodiment, the computer program may be downloaded from a network via the communication means 509 and installed, or installed from the storage means 508, or installed from the ROM 502. The computer program, when executed by the processing means 501, performs the above functions defined in the method of the embodiment of the present disclosure.

It should be noted that the above computer-readable medium of the present disclosure may be a computer-readable signal medium or a computer-readable storage medium or any combination of the above two. The computer-readable storage medium may be, for example, but is not limited to, an electronic, magnetic, optical, electromagnetic, infrared, or semiconductor system, apparatus, or device, or any combination of the foregoing. More specific examples of the computer-readable storage medium may include, but are not limited to: an electrical connection having one or more wires, a portable computer diskette, a hard disk, a random access memory (RAM), a read-only memory (ROM), an erasable programmable read-only memory (EPROM or flash memory), an optical fiber, a portable compact disc read-only memory (CD-ROM), an optical storage device, a magnetic storage device, or any suitable combination of the foregoing. In the present disclosure, the computer-readable storage medium may be any tangible medium containing or storing a program, wherein the program can be used by or in conjunction with an instruction execution system, apparatus, or device. And, in the present disclosure, the computer-readable signal medium may include a data signal propagated in baseband or as part of a carrier wave, in which computer-readable program code is carried. Such a propagated data signal may take a variety of forms, including, but not limited to, an electromagnetic signal, optical signal, or any suitable combination of the forgoing. The computer-readable signal medium may be any computer-readable medium other than the computer-readable storage medium, wherein the computer-readable signal medium can send, propagate, or transmit a program for use by or in conjunction with an instruction execution system, apparatus, or device. The program code contained on the computer-readable medium may be transmitted using any appropriate medium, including but not limited to: a wire, an optical cable, RF (Radio Frequency), etc., or any suitable combination of the foregoing.

In some embodiments, a client and a server may communicate using any currently known or future developed network protocol, such as HTTP (HyperText Transfer Protocol), and may be interconnected with digital data communication (e.g., a communication network) in any form or medium. Examples of the communication network include a local area network ("LAN"), a wide area network ("WAN"), an internet (e.g., the Internet), and a peer-to-peer network (e.g., an ad hoc peer-to-peer network), as well as any currently known or future developed network.

The above computer-readable medium may be contained in the above electronic device; or may be exist separately without being assembled into the electronic device.

The above computer-readable medium has one or more programs carried thereon, wherein the above one or more programs, when executed by the electronic device, cause the electronic device to: in response to a first operation acting on a first interface being displayed on a target area of an interactive interface, controlling the first interface and a preset second interface to move in a first direction, and controlling the second interface to be displayed in the target area, wherein if the second interface does not satisfy a preset condition, controlling the second interface to enter a first display state, so that an upper boundary of the second interface is aligned with an upper boundary of the target area; in response to a second operation acting on the second interface in the first display state, controlling the second interface to move in a second direction, the second interface entering a second display state from the first display state to change a display position of the second interface in the target area, wherein the second direction is perpendicular to the first direction; and triggering a state locking in the second display state to limit the second interface to return from the second display state to the first display state.

Optionally, when the above one or more programs are executed by the electronic device, the electronic device may further perform other steps described in the above embodiments.

Computer program code for performing the operation of the present disclosure may be written in one or more programming languages or a combination thereof, wherein the above programming language include but is not limited to an object-oriented programming language such as Java, Smalltalk, C++, and also include a conventional procedural programming language, such as the "C" programming language or a similar programming language. The program code may be executed entirely on a user's computer, partly on the user's computer, as a stand-alone software package, partly on the user's computer and partly on a remote computer, or entirely on a remote computer or server. In a scenario where the remote computer is involved, the remote computer may be connected to the user's computer through any type of network, including a local area network (LAN) or a wide area network (WAN), or may be connected to an external computer (for example, through the Internet using an Internet service provider).

The flow diagrams and block diagrams in the drawings illustrate the possibly implemented architecture, functions, and operations of the system, method and computer program product according to various embodiments of the present disclosure. In this regard, each block in the flow diagrams or block diagrams may represent a module, program segment, or portion of code, which includes one or more executable instructions for implementing a specified logical function. It should also be noted that, in some alternative implementations, functions noted in blocks may occur in a different order from those noted in the drawings. For example, two blocks shown in succession may, in fact, be executed substantially concurrently, or the blocks may sometimes be executed in a reverse order, which depends upon the functions involved. It will also be noted that each block in the block diagrams and/or flow diagrams, and a combination of the blocks in the block diagrams and/or flow diagrams, can be implemented by a special-purpose hardware-based system that performs specified functions or operations, or a combination of special-purpose hardware and computer instructions.

The involved unit described in the embodiments of the present disclosure may be implemented by software or hardware. The name of the unit does not, in some cases, constitute a limitation on the unit itself.

The functions described above herein may be executed, at least partially, by one or more hardware logic components. For example, without limitation, exemplary types of the hardware logic component that may be used include: a field programmable gate array (FPGA), application specific integrated circuit (ASIC), application specific standard product (ASSP), system on chip (SOC), complex programmable logic device (CPLD), and the like.

In the context of this disclosure, a machine-readable medium may be a tangible medium, which can contain, or store a program for use by or in conjunction with an instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination of the foregoing. More specific examples of the machine-readable storage medium include an electrical connection based on one or more wires, a portable computer diskette, a hard disk, a random access memory (RAM), a read-only memory (ROM), an erasable programmable read-only memory (EPROM or flash memory), an optical fiber, a portable compact disc read-only memory (CD-ROM), an optical storage device, a magnetic storage device, or any suitable combination of the foregoing.

According to one or more embodiments of the present disclosure, there is provided a display method, comprising: in response to a first operation acting on a first interface being displayed on a target area of an interactive interface, controlling the first interface and a preset second interface to move in a first direction, and controlling the second interface to be displayed in the target area, wherein if the second interface does not satisfy a preset condition, controlling the second interface to enter a first display state, so that an upper boundary of the second interface is aligned with an upper boundary of the target area; in response to a second operation acting on the second interface in the first display state, controlling the second interface to move in a second direction, the second interface entering a second display state from the first display state to change a display position of the second interface in the target area, wherein, the second direction is perpendicular to the first direction; and triggering a state locking in the second display state to limit the second interface to return from the second display state to the first display state.

According to one or more embodiments of the present disclosure, in the display method provided in the present disclosure, optionally, the method further comprises: in response to a first operation acting on the second interface in the first display state, controlling the second interface and a preset third interface to move in the first direction, and controlling the third interface to be displayed in the target area so that the third interface enters a third display state, an upper boundary of the third interface in the third display state being aligned with the upper boundary of the target area.

According to one or more embodiments of the present disclosure, in the display method provided in the present disclosure, optionally, the method further comprises: in response to a third operation acting on the second interface in the first display state, controlling the second interface to maintain the first display state, wherein a direction of the third operation is opposite to that of the second operation.

According to one or more embodiments of the present disclosure, in the display method provided in the present disclosure, optionally, the controlling the second interface to move in the second direction, the second interface entering the second display state from the first display state comprises:

controlling the second interface to move in the second direction, so that a first height at which the upper boundary of the second interface in the second display state is located is less than a preset height, the preset height being less than a second height at which the upper boundary of the target area is located.

According to one or more embodiments of the present disclosure, in the display method provided in the present disclosure, optionally, the method further comprises: after the second interface enters the second display state from the first display state, the method further comprising: in response to a third operation acting on the second interface, controlling the second interface to move in a third direction, so that a third height at which the upper boundary of the second interface is located is greater than the first height at which the upper boundary of the second interface in the second display state is located, and the third height is less than a preset height, wherein the third direction is opposite to the second direction.

According to one or more embodiments of the present disclosure, in the display method provided in the present disclosure, optionally, the method further comprises: the interactive interface comprising a first nested interface, the first nested interface comprising an interface to be redirected to based on the first interface by at least one first operation, and when a height of an upper boundary of the first nested interface is less than the second height at which the upper boundary of the target area is located, at least one second nested interface being displayed on the upper side of the first nested interface, wherein an interface to be redirected to in response to a first operation for the first nested interface is different from an interface to be redirected to in response to a first operation for the second nested interface, an interface to be redirected to in response to a second operation for the first nested interface is the same as an interface to be redirected to in response to a second operation for the second nested interface, and an interface to be redirected to in response to a third operation for the first nested interface is the same as an interface to be redirected to in response to a third operation for the second nested interface.

According to one or more embodiments of the present disclosure, in the display method provided in the present disclosure, optionally, the method further comprises: the preset height being a difference between a total height of the interactive interface and a minimum height required for complete display of the second nested interface.

According to one or more embodiments of the present disclosure, in the display method provided in the present disclosure, optionally, the method further comprises: the first operation comprising a horizontal swipe operation or triggering a swipe left/right control, and the first direction comprising a horizontal direction; and/or the second operation comprising a swipe down operation or triggering a swipe down control, and the second direction comprising a downward direction; and/or the third operation comprising a swipe up operation or triggering a swipe up control, and the third direction comprising an upward direction.

According to one or more embodiments of the present disclosure, in the display method provided in the present disclosure, optionally, the method further comprises: after the second interface enters the second display state from the first display state, the method further comprising: in response to the first operation acting on the second interface, controlling the second interface and a preset fourth interface to move in the first direction, and controlling the fourth interface to be displayed in the target area, so that the fourth interface enters a fourth display state, an upper boundary of the fourth interface in the fourth display state being aligned with the first height at which the upper boundary of the second interface in the second display state is located.

According to one or more embodiments of the present disclosure, in the display method provided in the present disclosure, optionally, the method further comprises: if the second interface satisfies the preset condition, the second interface being capable of returning to any previous state.

According to one or more embodiments of the present disclosure, in the display method provided in the present disclosure, optionally, the method further comprises: the preset condition comprising a height of the interface being greater than a height threshold.

According to one or more embodiments of the present disclosure, there is provided a display apparatus, comprising: a first display module configured to, in response to a first operation acting on a first interface being displayed on a target area of an interactive interface, control the first interface and a preset second interface to move in a first direction, and control the second interface to be displayed in the target area, wherein if the second interface does not satisfy a preset condition, control the second interface to enter a first display state, so that an upper boundary of the second interface is aligned with an upper boundary of the target area; a second display module configured to, in response to a second operation acting on the second interface in the first display state, control the second interface to move in a second direction, the second interface entering a second display state from the first display state to change a display position of the second interface in the target area, wherein, the second direction is perpendicular to the first direction; and a triggering module configured to trigger a state locking in the second display state to limit the second interface to return from the second display state to the first display state.

According to one or more embodiments of the present disclosure, in the display apparatus provided in the present disclosure, optionally, the apparatus further comprises: a third display module configured to, in response to a first operation acting on the second interface in the first display state, control the second interface and a preset third interface to move in the first direction, and control the third interface to be displayed in the target area so that the third interface enters a third display state, an upper boundary of the third interface in the third display state being aligned with the upper boundary of the target area.

According to one or more embodiments of the present disclosure, in the display apparatus provided in the present disclosure, optionally, the apparatus further comprises: a first control module configured to, in response to a third operation acting on the second interface in the first display state, control the second interface to maintain the first display state, wherein a direction of the third operation is opposite to that of the second operation.

According to one or more embodiments of the present disclosure, in the display apparatus provided in the present disclosure, optionally, the second display module comprises a control unit configured to control the second interface to move in the second direction, so that a first height at which the upper boundary of the second interface in the second display state is located is less than a preset height, the preset height being less than a second height at which the upper boundary of the target area is located.

According to one or more embodiments of the present disclosure, in the display apparatus provided in the present disclosure, optionally, the apparatus further comprises: a second control module configured to, after the second interface enters the second display state from the first display state, in response to a third operation acting on the second interface, control the second interface to move in a third direction, so that a third height at which the upper boundary of the second interface is located is greater than the first height at which the upper boundary of the second interface in the second display state is located, and the third height is less than the preset height, wherein the third direction is opposite to the second direction.

According to one or more embodiments of the present disclosure, in the display apparatus provided in the present disclosure, optionally, the interactive interface comprises a first nested interface, the first nested interface comprising an interface to be redirected to based on the first interface by at least one first operation, and when a height of an upper boundary of the first nested interface is less than the second height at which the upper boundary of the target area is located, at least one second nested interface being displayed on the upper side of the first nested interface, wherein an interface to be redirected to in response to a first operation for the first nested interface is different from an interface to be redirected to in response to a first operation for the second nested interface, an interface to be redirected to in response to a second operation for the first nested interface is the same as an interface to be redirected to in response to a second operation for the second nested interface, and an interface to be redirected to in response to a third operation for the first nested interface is the same as an interface to be redirected to in response to a third operation for the second nested interface.

According to one or more embodiments of the present disclosure, in the display apparatus provided in the present disclosure, optionally, the preset height is a difference between a total height of the interactive interface and a minimum height required for complete display of the second nested interface.

According to one or more embodiments of the present disclosure, in the display apparatus provided in the present disclosure, optionally, the first operation comprises a horizontal swipe operation or triggering a swipe left/right control, and the first direction comprises a horizontal direction; and/or the second operation comprises a swipe down operation or triggering a swipe down control, and the second direction comprises a downward direction; and/or the third operation comprises a swipe up operation or triggering a swipe up control, and the third direction comprises an upward direction.

According to one or more embodiments of the present disclosure, in the display apparatus provided in the present disclosure, optionally, the apparatus further comprises: a third control module configured to, after the second interface enters the second display state from the first display state, in response to a first operation acting on the second interface, control the second interface and a preset fourth interface to move in the first direction, and control the fourth interface to be displayed in the target area, so that the fourth interface enters a fourth display state, an upper boundary of the fourth interface in the fourth display state being aligned with the first height at which the upper boundary of the second interface in the second display state is located.

According to one or more embodiments of the present disclosure, in the display apparatus provided in the present disclosure, optionally, if the second interface satisfies the preset condition, the second interface is capable of returning to any previous state.

According to one or more embodiments of the present disclosure, in the display apparatus provided in the present disclosure, optionally, the preset condition comprises a height of the interface being greater than a height threshold.

According to one or more embodiments of the present disclosure, there is provided an electronic device, comprising:
one or more processors; and
a memory configured to store one or more programs, wherein the one or more programs, when executed by the one or more processors, cause the one or more processors to implement any of the display methods provided in the present disclosure.

According to one or more embodiments of the present disclosure, there is provided a computer-readable storage medium having thereon stored a computer program which, when executed by a processor, implements any of the display methods provided in the present disclosure.

An embodiment of the present disclosure further provides a computer program comprising instructions which, when executed by a processor, implement the display method as described above.

An embodiment of the present disclosure further provides a computer program product comprising a computer program or instructions which, when executed by a processor, implement the display method as described above.

The foregoing description is only the preferred embodiments of the present disclosure and an explanation of the technical principles employed. It should be appreciated by those skilled in the art that the disclosure scope involved in the present disclosure is not limited to the technical solutions formed by specific combinations of the technical features described above, but also encompasses other technical solutions formed by arbitrary combinations of the above technical features or equivalent features thereof without departing from the above disclosed concepts, for example, a technical solution formed by performing mutual replacement between the above features and technical features having similar functions to those disclosed (but not limited to) in the present disclosure.

Furthermore, while operations are depicted in a specific order, this should not be understood as requiring that these operations be performed in the specific order shown or in a sequential order. Under certain circumstances, multitasking and parallel processing might be advantageous. Similarly, while several specific implementation details are included in the above discussion, these should not be construed as limitations on the scope of the present disclosure. Certain features that are described in the context of separate embodiments may also be implemented in combination in a single embodiment. Conversely, various features that are described in the context of a single embodiment may also be implemented in multiple embodiments separately or in any suitable sub-combination.

Although the subject matter has been described in language specific to structural features and/or method logical actions, it should be understood that the subject matter defined in the attached claims is not necessarily limited to the specific features or actions described above. Rather, the specific features and actions described above are only example forms of implementing the claims.

What is claimed is:

1. A display method, comprising:
in response to a first operation acting on a first interface being displayed on a target area of an interactive interface, controlling the first interface and a preset second interface to move in a first direction, and controlling the second interface to be displayed in the target area, wherein the first direction comprises a horizontal direction, wherein the second interface is controlled to enter a first display state in response to the second interface not satisfying a preset condition, wherein an upper boundary of the second interface is aligned with an upper boundary of the target area, wherein the second interface not satisfying the preset condition comprises a height of the second interface being less than a height threshold;
in response to a second operation acting on the second interface in the first display state, controlling the second interface to move in a second direction, the second interface entering a second display state from the first display state to change a display position of the second interface in the target area, wherein, the second direction is perpendicular to the first direction; and
triggering a state locking in the second display state, to limit the second interface to return from the second display state to the first display state.

2. The method according to claim 1, further comprising:
in response to a first operation acting on the second interface in the first display state, controlling the second interface and a preset third interface to move in the first direction, and controlling the third interface to be displayed in the target area to make the third interface enter a third display state, an upper boundary of the third interface in the third display state being aligned with the upper boundary of the target area.

3. The method according to claim 1, further comprising:
in response to a third operation acting on the second interface in the first display state, controlling the second interface to maintain the first display state, wherein a direction of the third operation is opposite to that of the second operation.

4. The method according to claim 1, wherein the controlling the second interface to move in the second direction, the second interface entering the second display state from the first display state comprises:
controlling the second interface to move in the second direction, to set a first height at which the upper boundary of the second interface in the second display state is located to be less than a preset height, the preset height being less than a second height at which the upper boundary of the target area is located.

5. The method according to claim 4, wherein after the second interface enters the second display state from the first display state, the method further comprises:
in response to a third operation acting on the second interface, controlling the second interface to move in a third direction, to set a third height at which the upper boundary of the second interface is located to be greater than the first height at which the upper boundary of the second interface in the second display state is located, and the third height to be less than the preset height, wherein the third direction is opposite to the second direction.

6. The method according to claim 5, wherein the interactive interface comprises a first nested interface, the first nested interface comprising an interface to be redirected to based on the first interface by at least one first operation, and in response to a height of an upper boundary of the first nested interface is less than the second height at which the upper boundary of the target area is located, at least one second nested interface being displayed on the upper side of the first nested interface, wherein an interface to be redirected to in response to a first operation for the first nested interface is different from an interface to be redirected to in response to a first operation for the second nested interface, an interface to be redirected to in response to a second operation for the first nested interface is the same as an interface to be redirected to in response to a second operation for the second nested interface, and an interface to be redirected to in response to a third operation for the first nested interface is the same as an interface to be redirected to in response to a third operation for the second nested interface.

7. The method according to claim 6, wherein the preset height is a difference between a total height of the interactive interface and a minimum height required for complete display of the second nested interface.

8. The method according to claim 5, further comprising at least one of:

the first operation comprising a horizontal swipe operation or triggering a swipe left/right control;

the second operation comprising a swipe down operation or triggering a swipe down control, and the second direction comprising a downward direction; or the third operation comprising a swipe up operation or triggering a swipe up control, and the third direction comprising an upward direction.

9. The method according to claim 1, wherein after the second interface enters the second display state from the first display state, the method further comprises:

in response to a first operation acting on the second interface, controlling the second interface and a preset fourth interface to move in the first direction, and controlling the fourth interface to be displayed in the target area, to make the fourth interface enter a fourth display state, an upper boundary of the fourth interface in the fourth display state being aligned with the first height at which the upper boundary of the second interface in the second display state is located.

10. The method according to claim 1, further comprising:

in response to the second interface satisfying the preset condition, the second interface being capable of returning to any previous state.

11. An electronic device, comprising:

one or more processors;

a storage means configured to store one or more programs, wherein the one or more programs, when executed by the one or more processors, cause the one or more processors to implement the step of:

in response to a first operation acting on a first interface being displayed on a target area of an interactive interface, controlling the first interface and a preset second interface to move in a first direction, and controlling the second interface to be displayed in the target area, wherein the first direction comprises a horizontal direction, wherein the second interface is controlled to enter a first display state in response to the second interface not satisfying a preset condition, wherein an upper boundary of the second interface is aligned with an upper boundary of the target area, wherein the second interface not satisfying the preset condition comprises a height of the second interface being less than a height threshold;

in response to a second operation acting on the second interface in the first display state, controlling the second interface to move in a second direction, the second interface entering a second display state from the first display state to change a display position of the second interface in the target area, wherein, the second direction is perpendicular to the first direction; and triggering a state locking in the second display state, to limit the second interface to return from the second display state to the first display state.

12. The electronic device according to claim 11, wherein the one or more programs, when executed by the one or more processors, further cause the one or more processors to implement the step of:

in response to a first operation acting on the second interface in the first display state, controlling the second interface and a preset third interface to move in the first direction, and controlling the third interface to be displayed in the target area to make the third interface enter a third display state, an upper boundary of the third interface in the third display state being aligned with the upper boundary of the target area.

13. The electronic device according to claim 11, wherein the one or more programs, when executed by the one or more processors, further cause the one or more processors to implement the step of:

in response to a third operation acting on the second interface in the first display state, controlling the second interface to maintain the first display state, wherein a direction of the third operation is opposite to that of the second operation.

14. The electronic device according to claim 11, wherein the controlling the second interface to move in the second direction, the second interface entering the second display state from the first display state comprises:

controlling the second interface to move in the second direction, to set a first height at which the upper boundary of the second interface in the second display state is located to be less than a preset height, the preset height being less than a second height at which the upper boundary of the target area is located.

15. The electronic device according to claim 14, wherein the one or more programs, when executed by the one or more processors, further cause the one or more processors to implement the step of:

after the second interface enters the second display state from the first display state, in response to a third operation acting on the second interface, controlling the second interface to move in a third direction, to set a third height at which the upper boundary of the second interface is located to be greater than the first height at which the upper boundary of the second interface in the second display state is located, and the third height to be less than the preset height, wherein the third direction is opposite to the second direction.

16. The electronic device according to claim 15, wherein the interactive interface comprises a first nested interface, the first nested interface comprising an interface to be redirected to based on the first interface by at least one first operation, and in response to a height of an upper boundary of the first nested interface is less than the second height at which the upper boundary of the target area is located, at least one second nested interface being displayed on the upper side of the first nested interface, wherein an interface to be redirected to in response to a first operation for the first nested interface is different from an interface to be redirected to in response to a first operation for the second nested interface, an interface to be redirected to in response to a second operation for the first nested interface is the same as an interface to be redirected to in response to a second operation for the second nested interface, and an interface to be redirected to in response to a third operation for the first nested interface is the same as an interface to be redirected to in response to a third operation for the second nested interface.

17. The electronic device according to claim 16, wherein the preset height is a difference between a total height of the interactive interface and a minimum height required for complete display of the second nested interface.

18. The electronic device according to claim 15, wherein the one or more programs, when executed by the one or more processors, further cause the one or more processors to implement at least one of:

the first operation comprising a horizontal swipe operation or triggering a swipe left/right control;

the second operation comprising a swipe down operation or triggering a swipe down control, and the second direction comprising a downward direction; or the third operation comprising a swipe up operation or triggering a swipe up control, and the third direction comprising an upward direction.

19. A non-transitory computer-readable storage medium having thereon stored a computer program which, when executed by a processor, implements the step of:

in response to a first operation acting on a first interface being displayed on a target area of an interactive interface, controlling the first interface and a preset second interface to move in a first direction, and controlling the second interface to be displayed in the target area, wherein the first direction comprises a horizontal direction, wherein the second interface is controlled to enter a first display state in response to the second interface not satisfying a preset condition, wherein an upper boundary of the second interface is aligned with an upper boundary of the target area, wherein the second interface not satisfying the preset condition comprises a height of the second interface being less than a height threshold;

in response to a second operation acting on the second interface in the first display state, controlling the second interface to move in a second direction, the second interface entering a second display state from the first display state to change a display position of the second interface in the target area, wherein, the second direction is perpendicular to the first direction; and triggering a state locking in the second display state, to limit the second interface to return from the second display state to the first display state.

* * * * *